United States Patent
Buhager et al.

(10) Patent No.: US 11,554,466 B2
(45) Date of Patent: Jan. 17, 2023

(54) APPARATUSES AND SYSTEMS FOR INSTALLING PRE-MOLDED SEAL CAPS ONTO FASTENERS

(71) Applicant: The Boeing Company, Chicago, IL (US)

(72) Inventors: John M. Buhager, Marlton, NJ (US); Stephen J. Chant, Philadelphia, PA (US)

(73) Assignee: The Boeing Company, Chicago, IL (US)

( * ) Notice: Subject to any disclaimer, the term of this patent is extended or adjusted under 35 U.S.C. 154(b) by 433 days.

(21) Appl. No.: 16/869,255

(22) Filed: May 7, 2020

(65) Prior Publication Data
US 2021/0347014 A1 Nov. 11, 2021

(51) Int. Cl.
*B25C 7/00* (2006.01)
*B25B 9/00* (2006.01)
*B65G 47/90* (2006.01)
*F16B 11/00* (2006.01)
*B65G 23/04* (2006.01)

(52) U.S. Cl.
CPC .............. *B25B 9/00* (2013.01); *B65G 23/04* (2013.01); *B65G 47/902* (2013.01); *F16B 11/002* (2013.01)

(58) Field of Classification Search
CPC ......... F16B 11/002; B65G 23/04; B25B 9/00; B25G 47/902
USPC .................................................. 227/15, 135
See application file for complete search history.

(56) References Cited

U.S. PATENT DOCUMENTS

| 7,628,305 | B2 * | 12/2009 | Vanden Berg | B25C 5/1693 227/135 |
|---|---|---|---|---|
| 10,865,820 | B2 * | 12/2020 | Buhager | B25B 27/0028 |
| 11,187,257 | B2 * | 11/2021 | Buhager | B65G 23/22 |
| 2015/0271960 | A1 * | 9/2015 | Yoon | B32B 37/12 156/244.11 |
| 2016/0207182 | A1 * | 7/2016 | Sprik | B25B 11/007 |
| 2020/0018336 | A1 | 1/2020 | Buhager et al. | |

* cited by examiner

*Primary Examiner* — Todd M Epps
(74) *Attorney, Agent, or Firm* — Quinn IP Law

(57) ABSTRACT

An end effector for installing pre-molded seal caps onto fasteners comprises a cap-dispenser assembly and a cap-placement assembly. The cap-placement assembly comprises a main housing and a plunger mechanism, comprising an outer plunger housing and an inner gripper. The inner gripper is rotatable relative to the outer plunger housing between a cap-retaining configuration and a cap-releasing configuration. The plunger mechanism is selectively translatable from an extended position to a retracted position and from the retracted position to the extended position. The main housing is selectively rotatable from a cap-receiving position, in which the plunger mechanism is aligned with the seal-cap-delivery-sleeve central axis, to a cap-installing position, in which the main housing is angularly displaced from the cap-receiving position, and from the cap-installing position to the cap-receiving position.

20 Claims, 14 Drawing Sheets

APPARATUSES AND SYSTEMS FOR INSTALLING PRE-MOLDED SEAL CAPS ONTO FASTENERS

TECHNICAL FIELD

The subject matter, disclosed herein, relates to apparatuses and systems for installing pre-molded seal caps onto fasteners, extending from a surface.

BACKGROUND

During assembly of a structure, such as an aircraft or a component thereof, pre-molded seal caps must often be installed onto fasteners, extending from a surface of the structure. It is desirable to fully automate such installation of the pre-molded seal caps to reduce cost and manufacturing lead time. However, complex movements, related to retrieving a pre-molded end cap from a supply of end caps, positioning the pre-molded end cap over the fastener, and installing the pre-molded end cap on the fastener, make automating the installation of pre-molded end caps difficult. In some applications, the pre-molded end cap is filled with a sealant prior to installation, further increasing the complexity of automating installation.

SUMMARY

Accordingly, apparatuses, systems, and methods, intended to address at least the above-identified concerns, would find utility.

The following is a non-exhaustive list of examples, which may or may not be claimed, of the subject matter, disclosed herein.

Disclosed herein is an end effector for installing pre-molded seal caps onto fasteners that extend from a surface. The end effector comprises a frame and a cap-dispenser assembly, coupled to the frame and comprising a seal-cap-delivery sleeve, having a seal-cap-delivery-sleeve central axis. The end effector also comprises a cap-placement assembly, coupled to the frame, and rotatable relative to the frame. The cap-placement assembly comprises a main housing and plunger mechanism, coupled to main housing. The plunger mechanism comprises an outer plunger housing, comprising an interior chamber that has an interior-chamber central axis. The plunger mechanism also comprises an inner gripper, at least a portion of which is located in the interior chamber of the outer plunger housing. The inner gripper comprises a first finger and a second finger. The first finger and the second finger are opposite each other along a finger axis that is perpendicular to the interior-chamber central axis. The inner gripper is rotatable relative to the outer plunger housing, within the interior chamber, between a cap-retaining configuration and a cap-releasing configuration. The first finger and the second finger are closer to each other in the cap-retaining configuration than in the cap-releasing configuration. The plunger mechanism is selectively translatable, relative to the main housing, from an extended position to a retracted position and from the retracted position to the extended position. The outer plunger housing of the plunger mechanism protrudes farther from the main housing when the plunger mechanism is in the extended position than when the plunger mechanism is in the retracted position. The main housing is selectively rotatable from a cap-receiving position, in which the plunger mechanism is aligned with the seal-cap-delivery-sleeve central axis, to a cap-installing position, in which the main housing is angularly displaced from the cap-receiving position, and from the cap-installing position to the cap-receiving position.

The end effector enables a plurality of the pre-molded seal caps to be sequentially installed on a plurality of the fasteners that extend from the surface, thereby minimizing the amount of manual labor. Use of the frame provides structure for supporting components of the end effector. The cap-dispenser assembly enables a plurality of the pre-molded seal caps to be obtained by the end effector. Specifically, the cap-dispenser assembly comprises the seal-cap-delivery sleeve, having a seal-cap-delivery-sleeve central axis. The seal-cap-delivery sleeve positively locates the position, at which each one of the pre-molded seal caps is provided and obtained by the end effector.

The cap-placement assembly, which is coupled to the frame and is rotatable relative to the frame, enables the end effector to obtain one of the pre-molded seal caps from the cap-dispenser assembly and to install one of the pre-molded seal caps onto one of the fasteners. The use of the main housing provides a primary structure for supporting the components of the cap-dispenser assembly. The plunger mechanism selectively grasps, positions, and releases one of the pre-molded seal caps during operation of the end effector. The outer plunger housing of the plunger mechanism provides the interior chamber, with the interior-chamber central axis, for enclosing and interacting with the inner gripper, of which at least a portion is located in the interior chamber of the outer plunger housing. The first finger and the second finger of the inner gripper are selectively actuatable to grasp or release one of the pre-molded seal caps. Specifically, the first finger and the second finger are opposite each other along the finger axis, which is perpendicular to the interior-chamber central axis, and the inner gripper is rotatable relative to the outer plunger housing, within the interior chamber, between a cap-retaining configuration for grasping one of the pre-molded seal caps, and a cap-releasing configuration for releasing one of the pre-molded seal caps. The interior chamber of the outer plunger housing is shaped so that the first finger and the second finger are closer to each other in the cap-retaining configuration than in the cap-releasing configuration.

The plunger mechanism is translatable, relative to the main housing, between, inclusively, the extended position and the retracted position, thereby to position one of the pre-molded seal caps during operation of the end effector. Specifically, the outer plunger housing of the plunger mechanism protrudes farther from the main housing when the plunger mechanism is in the extended position than when the plunger mechanism is in the retracted position, to place one of the pre-molded seal caps in position to interact with other components of the end effector and the one of fasteners. The retracted position of the plunger mechanism facilitates rotation of the cap-placement assembly by minimizing possibility of mechanical interference with components of the end effector 200 and the surrounding environment.

Use of the rotatable main housing enables the cap-placement assembly to interact with other components of the end effector and the fasteners. The cap-receiving position of the main housing aligns the plunger mechanism with the seal-cap-delivery-sleeve central axis to allow one of the pre-molded seal caps to be obtained from the cap dispenser assembly. The cap-installing position of the main housing is angularly displaced from the cap-receiving position, to permit one of the pre-molded seal caps to be installed on one of the fasteners.

Also disclosed herein is a system for installing pre-molded seal caps onto fasteners that extend from a surface. The system comprises an end effector, comprising a frame, a cap-dispenser assembly, and a cap-placement assembly. The cap-dispenser assembly is coupled to the frame and comprises a seal-cap-delivery sleeve, having a seal-cap-delivery-sleeve central axis. The cap-placement assembly is coupled to the frame and is rotatable relative to the frame. The cap-placement assembly comprises a main housing and plunger mechanism, coupled to main housing. The plunger mechanism comprises an outer plunger housing, comprising interior chamber that has an interior-chamber central axis. The plunger mechanism also comprises an inner gripper, at least a portion of which is located in the interior chamber of the outer plunger housing. The inner gripper comprises a first finger and a second finger. The first finger and the second finger are opposite each other along a finger axis that is perpendicular to the interior-chamber central axis. The inner gripper is rotatable relative to the outer plunger housing, within the interior chamber, between a cap-retaining configuration and a cap-releasing configuration. The first finger and the second finger are closer to each other in the cap-retaining configuration than in the cap-releasing configuration. The plunger mechanism is selectively translatable, relative to the main housing, from an extended position to a retracted position and from the retracted position to the extended position. The outer plunger housing of the plunger mechanism protrudes farther from the main housing when the plunger mechanism is in the extended position than when the plunger mechanism is in the retracted position. The main housing is selectively rotatable from a cap-receiving position, in which the plunger mechanism is aligned with the seal-cap-delivery-sleeve central axis, to a cap-installing position, in which the main housing is angularly displaced from the cap-receiving position, and from the cap-installing position to the cap-receiving position. The system also comprises a controller, operatively coupled to the end effector, and a robot, supporting the end effector and the controller.

The system enables a plurality of the pre-molded seal caps to be sequentially installed on a plurality of the fasteners. The end effector enables automatic installation of the pre-molded seal caps onto the fasteners that extend from the surface, thereby minimizing the amount of manual labor. Use of the frame provides a structure for supporting components of the end effector. The cap-dispenser assembly enables a plurality of pre-molded seal caps to be obtained by the end effector. Specifically, the cap-dispenser assembly includes the seal-cap-delivery sleeve having the seal-cap-delivery-sleeve central axis, which positively locates the position at which each one of the pre-molded seal caps is provided and obtained by the end effector.

The cap-placement assembly, which is coupled to the frame, and is rotatable relative to the frame, enables the end effector to obtain one of the pre-molded seal caps from the cap-dispenser assembly and to install one of the pre-molded seal caps onto one of the fasteners. The use of the main housing provides structure for supporting the components of the cap-dispenser assembly. The plunger mechanism selectively grasps, positions, and releases one of the pre-molded seal caps during operation of the end effector. The outer plunger housing of the plunger mechanism provides the interior chamber, with the interior-chamber central axis, for enclosing and interacting with the inner gripper, of which at least a portion is located in the interior chamber of the outer plunger housing. The first finger and the second finger of the inner gripper are selectively actuatable to grasp or release one of the pre-molded seal caps. Specifically, the first finger and the second finger are opposite each other along the finger axis, which is perpendicular to the interior-chamber central axis, and the inner gripper is rotatable relative to the outer plunger housing, within the interior chamber, between the cap-retaining configuration for grasping one of the pre-molded seal caps, and the cap-releasing configuration for releasing one of the pre-molded seal caps. The interior chamber of the outer plunger housing is shaped so that the first finger and the second finger are closer to each other in the cap-retaining configuration than in the cap-releasing configuration.

The plunger mechanism is translatable, relative to the main housing, between, inclusively, the extended position and the retracted position, thereby to position one of the pre-molded seal caps during operation of the end effector. Specifically, the outer plunger housing of the plunger mechanism protrudes farther from the main housing when the plunger mechanism is in the extended position than when the plunger mechanism is in the retracted position, to place one of the pre-molded seal caps in position to interact with other components of the end effector and the fasteners. The retracted position of the plunger mechanism facilitates rotation of the cap-placement assembly by minimizing possibility of mechanical interference with components of the end effector 200 and the surrounding environment.

Use of the rotatable main housing enables the cap-placement assembly to interact with other components of the end effector and the fasteners. The cap-receiving position of the main housing aligns the plunger mechanism with the seal-cap-delivery-sleeve central axis to allow one of the pre-molded seal caps to be obtained from the cap dispenser assembly. The cap-installing position of the main housing is angularly displaced from the cap-receiving position, to permit one of the pre-molded seal caps to be installed onto one of the fasteners. Use of the controller enables programmable operation of the end effector.

Use of the robot to support the end effector and the controller enables the system to rapidly install, in sequence, a plurality of the pre-molded seal caps onto a plurality of the fasteners. The robot repositions the end effector over the surface, thereby placing the cap-placement assembly over a first one of the fasteners. After installing one of the pre-molded seal caps on the first one of the fasteners, the robot enables the end effector to be repositioned over a second one of the fasteners to install another of the pre-molded seal caps on the second one of the fasteners. The robot further enables the end effector to be repositioned over a third and subsequent ones of the fasteners, to allow the end effector to install additional ones of the pre-molded seal caps.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1:
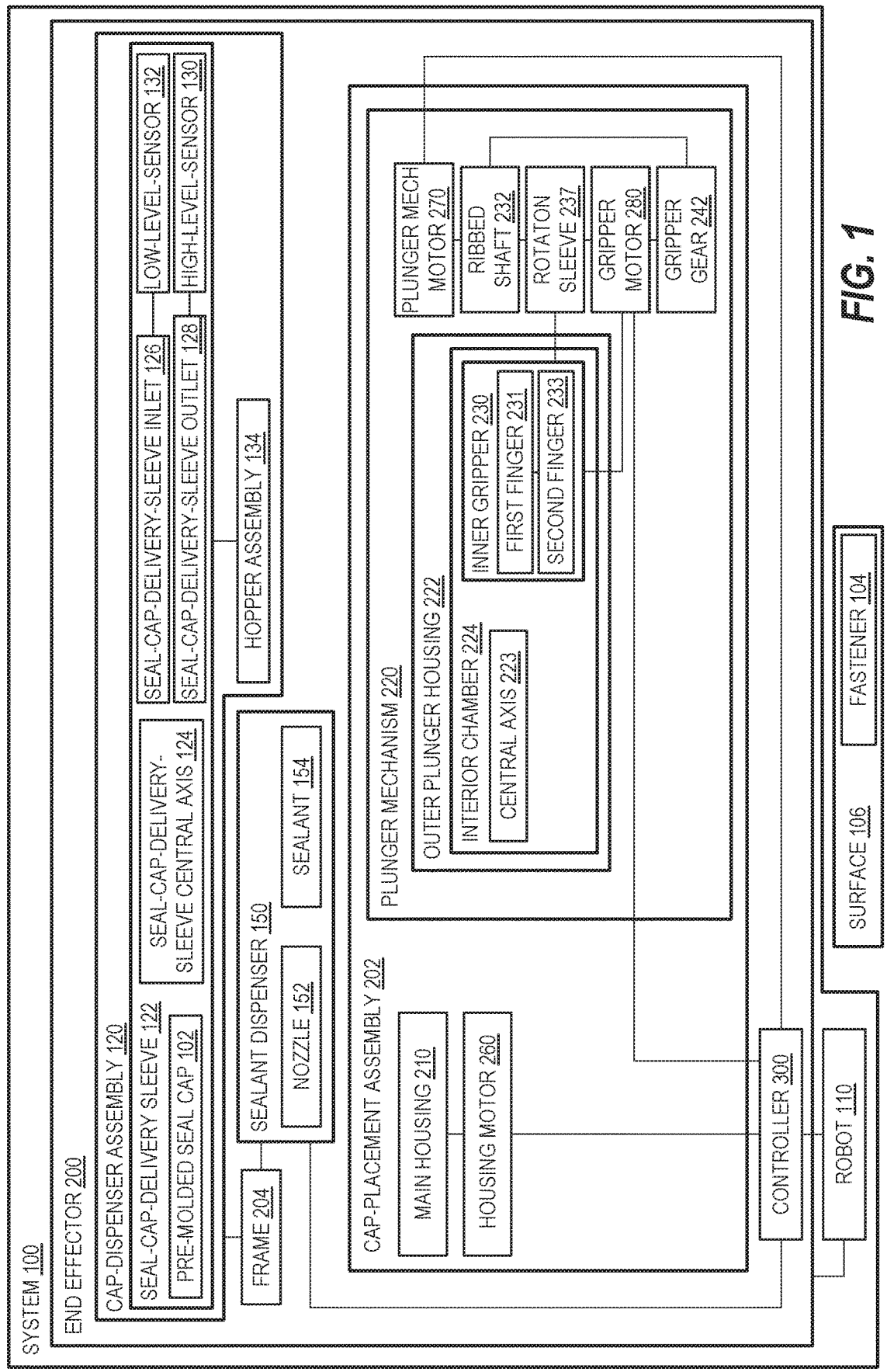
FIG. 1 is a block diagram of an apparatus for installing pre-molded seal caps on fasteners, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 19:
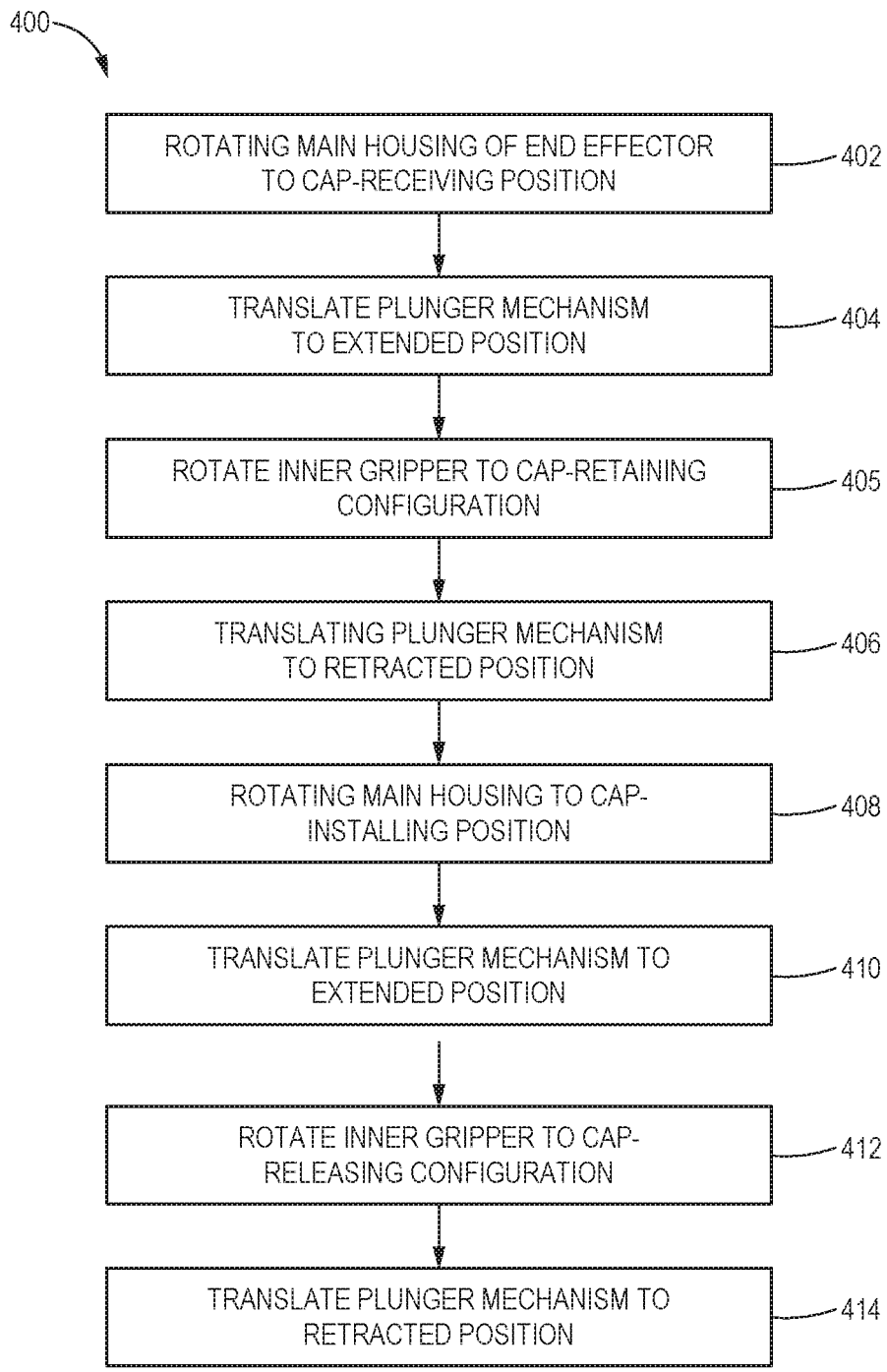
FIG. 19 is a block diagram of a method, according to one or more examples of the subject matter, disclosed herein, of installing a pre-molded seal caps onto fasteners utilizing the apparatus of FIG. 1, according to one or more examples of the subject matter, disclosed herein.
Figure 20:
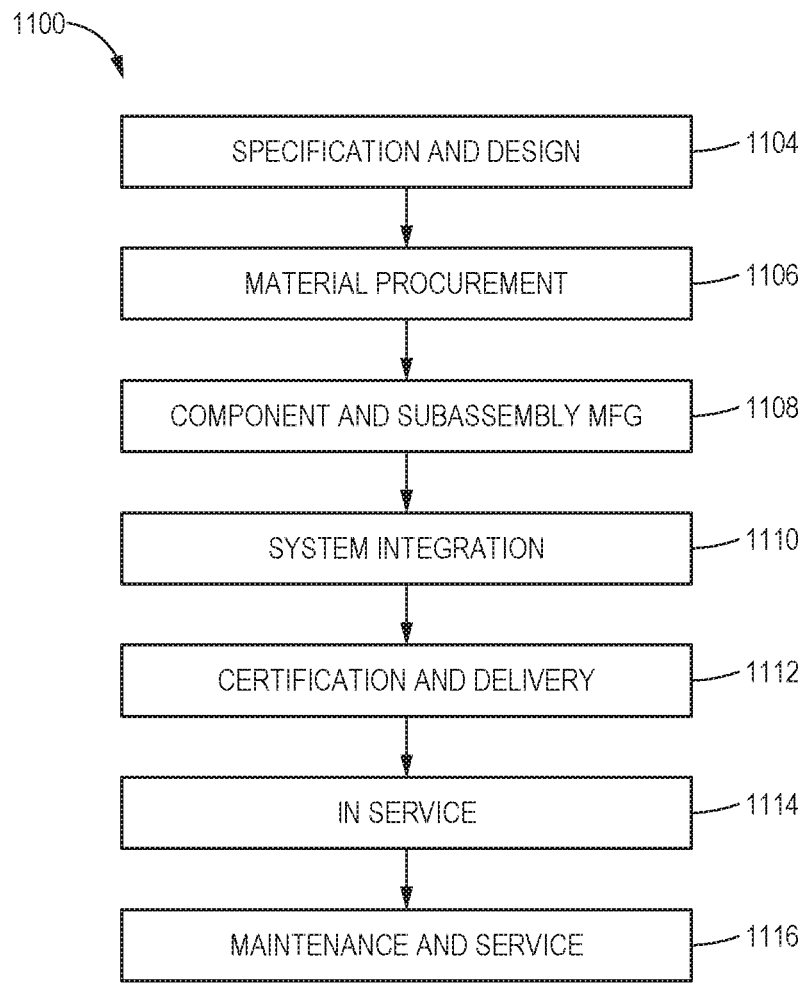
FIG. 20 is a block diagram of aircraft production and service methodology.

In FIGS. 19 and 20, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 19 and 20 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter, disclosed herein, are provided below.

Referring generally to FIG. 1, and particularly to, e.g., FIGS. 2-7, 11, and 12 for illustrative purposes only and not by way of limitation, end effector 200 for installing pre-molded seal caps 102 onto fasteners 104 that extend from surface 106 is disclosed. End effector 200 comprises frame 204 and cap-dispenser assembly 120, coupled to frame 204 and comprising seal-cap-delivery sleeve 122, having seal-cap-delivery-sleeve central axis 124. End effector 200 also comprises cap-placement assembly 202, coupled to frame 204 and rotatable relative to frame 204. Cap-placement assembly 202 comprises main housing 210, and plunger mechanism 220, coupled to main housing 210. Plunger mechanism 220 comprises outer plunger housing 222, comprising interior chamber 224 that has interior-chamber central axis 223. Plunger mechanism 220 also comprises inner gripper 230, at least a portion of which is located in interior chamber 224 of outer plunger housing 222. Inner gripper 230 comprises first finger 231 and second finger 233. First finger 231 and second finger 233 are opposite each other along finger axis 235 that is perpendicular to interior-chamber central axis 223. Inner gripper 230 is rotatable relative to outer plunger housing 222, within interior chamber 224, between a cap-retaining configuration and a cap-releasing configuration. First finger 231 and second finger 233 are closer to each other in the cap-retaining configuration than in the cap-releasing configuration. Plunger mechanism 220 is selectively translatable, relative to main housing 210, from an extended position to a retracted position and from the retracted position to the extended position. Outer plunger housing 222 of plunger mechanism 220 protrudes farther from main housing 210 when plunger mechanism 220 is in the extended position than when plunger mechanism 220 is in the retracted position. Main housing 210 is selectively rotatable from a cap-receiving position, in which plunger mechanism 220 is aligned with seal-cap-delivery-sleeve central axis 124, to a cap-installing position, in which main housing 210 is angularly displaced from the cap-receiving position, and from the cap-installing position to the cap-receiving position. The preceding portion of this paragraph characterizes example one of the subject matter, disclosed herein.

End effector 200 is able to automatically install pre-molded seal caps 102 onto fasteners 104 that extend from surface 106, thereby minimizing the amount of manual labor. Use of frame 204 provides structure for supporting components of end effector 200. Cap-dispenser assembly 120 enables a plurality of pre-molded seal caps 102 to be obtained by end effector 200. Specifically, cap-dispenser assembly 120 includes seal-cap-delivery sleeve 122 having seal-cap-delivery-sleeve central axis 124, which positively locates the position, at which one of pre-molded seal caps 102 is provided and obtained by end effector 200.

Cap-placement assembly 202, which is coupled to frame 204, and is rotatable relative to frame 204, enables end effector 200 to obtain one of pre-molded seal caps 102 from cap-dispenser assembly 120 and to install one of pre-molded seal caps 102 on one of fasteners 104. The use of main housing 210 provides primary structure for supporting components of cap-dispenser assembly 120. Plunger mechanism 220 selectively grasps, positions, and releases one of pre-molded seal caps 102 during operation of end effector 200. Outer plunger housing 222 of plunger mechanism 220 provides interior chamber 224, with interior-chamber central axis 223, for enclosing and interacting with inner gripper 230, of which at least a portion is located in interior chamber 224 of outer plunger housing 222. First finger 231 and second finger 233 of inner gripper 230 are selectively actuatable to grasp or release one of pre-molded seal caps 102. Specifically, first finger 231 and second finger 233 are opposite each other along finger axis 235, which is perpendicular to interior-chamber central axis 223, and inner gripper 230 is rotatable relative to outer plunger housing 222, within interior chamber 224, between the cap-retaining configuration for grasping one of pre-molded seal caps 102, and the cap-releasing configuration for releasing one of pre-molded seal caps 102. Interior chamber 224 of outer plunger housing 222 is shaped so that first finger 231 and second finger 233 are closer to each other in the cap-retaining configuration than in the cap-releasing configuration.

In one or more examples, outer plunger housing 222 and inner gripper 230 interact to selectively place inner gripper in the cap-retaining configuration and the cap-releasing configuration. For example, interior chamber 224 has an elliptical cross-sectional shape defining an outer-plunger-housing major-ellipse dimension and an outer-plunger-housing minor-ellipse dimension. First finger 231 and second finger 233 similarly are contoured to define an inner-gripper major-ellipse dimension and an inner-gripper minor-ellipse dimension. In the cap-releasing configuration, inner gripper 230 is positioned so that the inner-gripper major-ellipse dimension is aligned with outer-plunger-housing major-ellipse dimension. When rotated to the cap-retaining configuration, inner-gripper major-ellipse dimension is aligned with outer-plunger-housing major-ellipse dimension, which deflects first finger 231 and second finger 233 inwardly toward finger axis 235. Accordingly, rotation of inner gripper 230 from the cap-releasing configuration to the cap-retaining configuration enables inner gripper 230 to selectively retain one of pre-molded seal caps 102 between first finger 231 and second finger 233.

Plunger mechanism 220 is translatable, relative to main housing 210, between, inclusively, the extended position and the retracted position to position one of pre-molded seal caps 102 during operation of end effector 200. Specifically, outer plunger housing 222 of plunger mechanism 220 protrudes farther from main housing 210 when plunger mechanism 220 is in the extended position than when plunger mechanism 220 is in the retracted position, to place one of pre-molded seal caps 102 in position to interact with other components of end effector 200 and fasteners 104. The retracted position of plunger mechanism 220 facilitates rotation of cap-placement assembly 202 by minimizing possibility of mechanical interference with components of end effector 200 and surrounding environment.

Use of rotatable main housing 210 enables cap-placement assembly 202 to interact with other components of end effector 200 and fasteners 104. The cap-receiving position of main housing 210 aligns plunger mechanism 220 with seal-cap-delivery-sleeve central axis 124 to allow one of pre-molded seal caps 102 to be obtained from cap-dispenser assembly 120. The cap-installing position of main housing 210 is angularly displaced from the cap-receiving position, to permit one of pre-molded seal caps 102 to be installed on one of fasteners 104.

End effector 200 is configured to facilitate a reduction in the lead time, associated with installation of pre-molded seal caps 102 onto fasteners 104 that extend from surface 106 of a structure being assembled. Generally, end effector 200 is used for automated retrieval of pre-molded seal caps 102 from cap-dispenser assembly 120 and automated installation of pre-molded seal caps 102 onto fasteners 104. Cap-dispenser assembly 120 holds one of pre-molded seal caps 102 in a known location relative to cap-placement assembly 202. Cap-placement assembly 202 retrieves one of pre-molded seal caps 102 from cap-dispenser assembly 120, transports one of pre-molded seal caps 102 to a position over one of fasteners 104, and installs one of pre-molded seal caps 102 onto one of fasteners 104.

Figure 3:
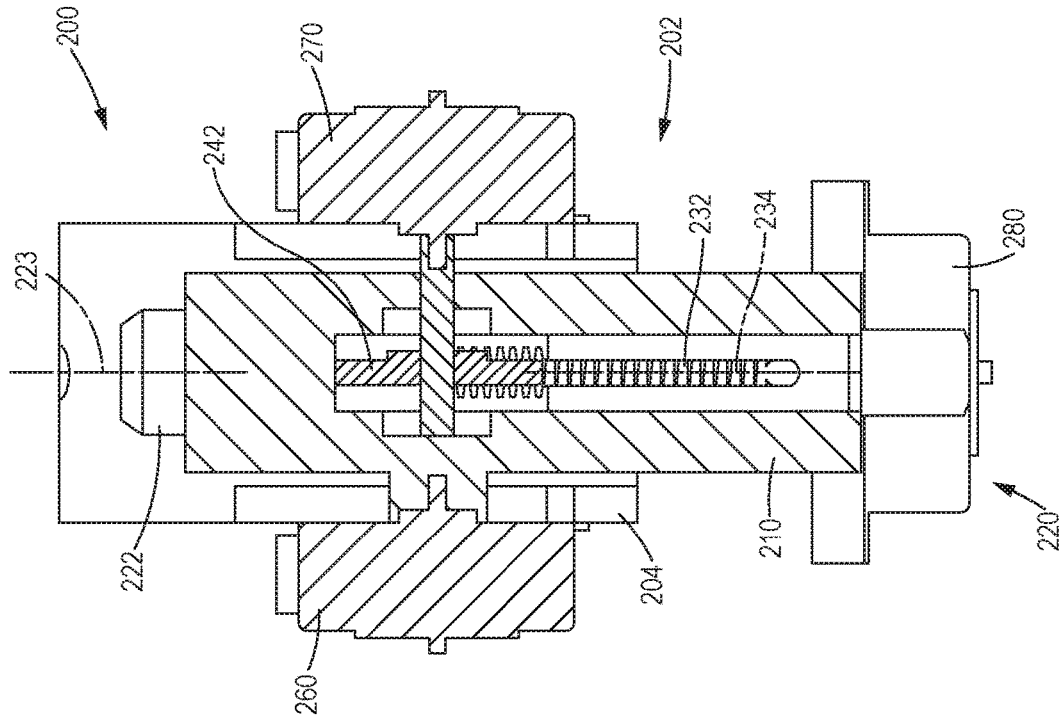
FIG. 3 is a schematic, elevation, sectional view of the apparatus of FIG. 1 according to one or more examples of the subject matter, disclosed herein.
Figure 2:
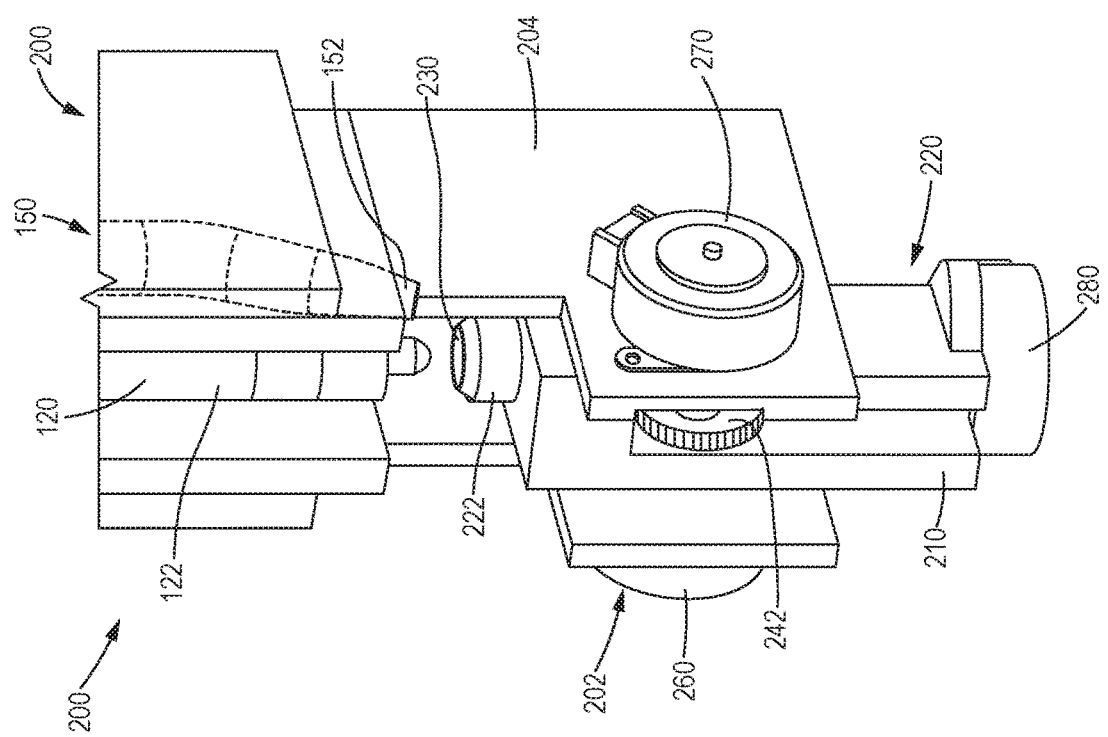
FIG. 2 is a schematic, perspective view of the apparatus of FIG. 1, according to one or more examples of the subject matter, disclosed herein.

Referring generally to FIG. 1 and particularly to, e.g., FIGS. 2 and 3 for illustrative purposes only and not by way of limitation, cap-placement assembly 202 further comprises housing motor 260, configured to selectively rotate main housing 210 from the cap-receiving position to the cap-installing position and from the cap-installing position to cap-receiving position. The preceding portion of this paragraph characterizes example two of the subject matter, disclosed herein, where example two also encompasses example one, above.

Use of housing motor 260 enables automatic rotation of main housing 210 without requiring manual positioning. Using housing motor 260 to rotate main housing 210 between the cap-receiving position and the cap-installing position enables more precise and reliable positioning of main housing during operation of end effector 200.

Generally, in various examples, housing motor 260 includes an output shaft that is rotatable by housing motor 260 to produce rotary force or torque when housing motor 260 is operated. In various examples, housing motor 260 is any one of various rotational motors, such as an electric motor, a hydraulic motor, a pneumatic motor, an electromagnetic motor, and the like. In various examples, housing motor 260 is coupled to main housing 210.

Referring generally to FIG. 1 and particularly to, e.g., FIGS. 4-5, 11-12, and 14 for illustrative purposes only and not by way of limitation, cap-placement assembly 202 further comprises plunger-mechanism motor 270, configured to selectively translate plunger mechanism 220 from the extended position to the retracted position, relative to main housing 210, and from the retracted position to the extended position. The preceding portion of this paragraph characterizes example three of the subject matter, disclosed herein, where example three also encompasses example two, above.

Use of plunger-mechanism motor 270 enables automatic translation of plunger mechanism 220 without requiring manual positioning. Using plunger-mechanism motor 270 to translate plunger mechanism 220 between the extended position and the retracted position enables more precise and reliable positioning of plunger mechanism 220 during operation of end effector 200.

Generally, in various examples, plunger-mechanism motor 270 includes an output shaft that is rotatable by plunger-mechanism motor 270 to produce rotary force or torque when plunger-mechanism motor 270 is operated. In various examples, plunger-mechanism motor 270 is any one of various rotational motors, such as an electric motor, a hydraulic motor, a pneumatic motor, an electromagnetic motor, and the like. In various examples, plunger-mechanism motor 270 is coupled to plunger mechanism 220.

Referring generally to FIG. 1 and particularly to, e.g., FIGS. 2-5 and 14 for illustrative purposes only and not by way of limitation, cap-placement assembly 202 further comprises gripper motor 280, configured to rotate inner gripper 230 from the cap-retaining configuration to the cap-releasing configuration and from the cap-releasing configuration to the cap-retaining configuration. The preceding portion of this paragraph characterizes example four of the subject matter, disclosed herein, where example four also encompasses example three, above.

Use of gripper motor 280 enables automatic rotation of inner gripper 230 within outer plunger housing 222. Using gripper motor 280 to rotate inner gripper 230 between the cap-retaining configuration and the cap-releasing configuration enables more precise and reliable positioning of inner gripper 230 during operation of end effector 200.

Generally, in various examples, gripper motor 280 includes an output shaft that is rotatable by gripper motor 280 to produce rotary force or torque when gripper motor 280 is operated. In various examples, gripper motor 280 is any one of various rotational motors, such as an electric motor, a hydraulic motor, a pneumatic motor, an electromagnetic motor, and the like. In various examples, gripper motor 280 is coupled to inner gripper 230.

Referring generally to FIG. 1 and particularly to, e.g., FIGS. 2, 11-12, and 14 for illustrative purposes only and not by way of limitation, end effector 200 further comprises controller 300, operably coupled to housing motor 260, plunger-mechanism motor 270, and gripper motor 280. Controller 300 is programmed to operate housing motor 260 to rotate main housing 210 to the cap-receiving position. Additionally, controller 300 is programmed to operate plunger-mechanism motor 270 to translate plunger mechanism 220 to the extended position relative to main housing 210, so that inner gripper 230 is adjacent cap-dispenser assembly 120. Still further, controller 300 is programmed to operate gripper motor 280 to rotate inner gripper 230 to the cap-retaining configuration and to operate plunger-mechanism motor 270 to translate plunger mechanism 220 to the retracted position relative to main housing 210. Furthermore, controller 300 is programmed to operate housing motor 260 to rotate main housing 210 to the cap-installing position, to operate plunger-mechanism motor 270 to translate plunger mechanism 220 to the extended position relative to main housing 210, and to operate gripper motor 280 to rotate inner gripper 230 to the cap-releasing configuration. Also, controller 300 is programmed to operate plunger-mechanism motor 270 to translate plunger mechanism 220 to the retracted position relative to main housing 210. The preceding portion of this paragraph characterizes example five of the subject matter, disclosed herein, where example five also encompasses example four, above.

Use of controller 300 enables programmable operation of end effector 200. Specifically, controller 300 controls operation of housing motor 260, plunger-mechanism motor 270, and gripper motor 280. Additionally, controller 300 stores instructions for operating housing motor 260, plunger-mechanism motor 270, and gripper motor 280. The instructions include a sequence of motor operations to be performed during operation of end effector 200. In one or more examples, controller 300 is programmed to automatically perform a seal-cap installation operation by sequentially operating:

housing motor 260 to rotate main housing 210 to the cap-receiving position, thereby to align cap-dispenser assembly 120 with seal-cap-delivery-sleeve central axis 124;

plunger-mechanism motor 270 to translate plunger mechanism 220 to the extended position, so that inner gripper 230 is adjacent cap-dispenser assembly 120;

gripper motor 280 to rotate inner gripper 230 to the cap-retaining configuration, so that first finger 231 and second finger 233 grasp pre-molded seal cap 102;

plunger-mechanism motor 270 to translate plunger mechanism 220 to the retracted position, to reduce potential interference during subsequent movement of main housing 210;

housing motor 260 to rotate main housing 210 to the cap-installing position, thereby to align cap-dispenser assembly 120 with one of fasteners 104;

plunger-mechanism motor 270 to translate plunger mechanism 220 to the extended position, so that inner gripper 230 is adjacent one of fasteners 104;

gripper motor 280 to rotate inner gripper 230 to the cap-releasing configuration, thereby to install one of pre-molded seal caps 102 onto one of fasteners 104; and plunger-mechanism motor 270 to translate plunger mechanism 220 to the retracted position, thereby to reduce potential interference during subsequent movement of main housing 210.

In various examples, controller 300 includes at least one electronic controller (e.g., a programmable processor). Controller 300 is operatively coupled to housing motor 260 and controls the angular position of main housing 210 between the cap-receiving position and the cap-installing position. Controller 300 also is operatively coupled to plunger-mechanism motor 270 and controls translation of plunger mechanism 220 between the retracted position and the extended position. Still further, controller 300 is operatively coupled to gripper motor 280 and controls rotation of inner gripper 230 between the cap-releasing configuration and the cap-retaining configuration.

In various examples, controller 300 is programmed to operate housing motor 260, plunger-mechanism motor 270, and gripper motor 280 in the sequence, presented above, thereby to install one of pre-molded seal caps 102 onto one of fasteners 104.

Figure 13:
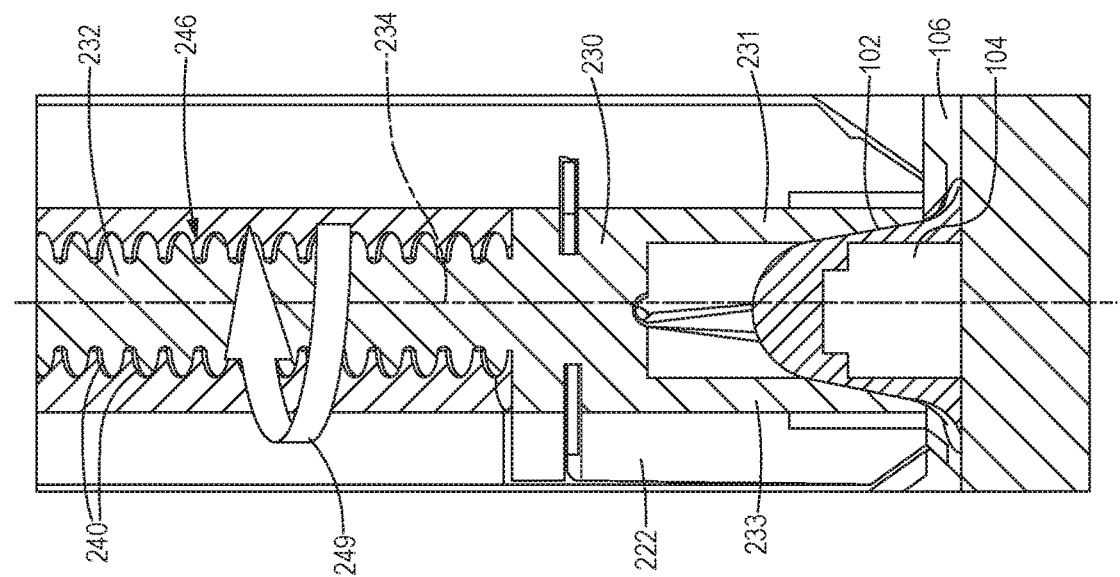
FIG. 13 is a schematic, elevation, sectional view of a sub-assembly of the apparatus of FIG. 1, according to one or more examples of the subject matter, disclosed herein.
Figure 12:
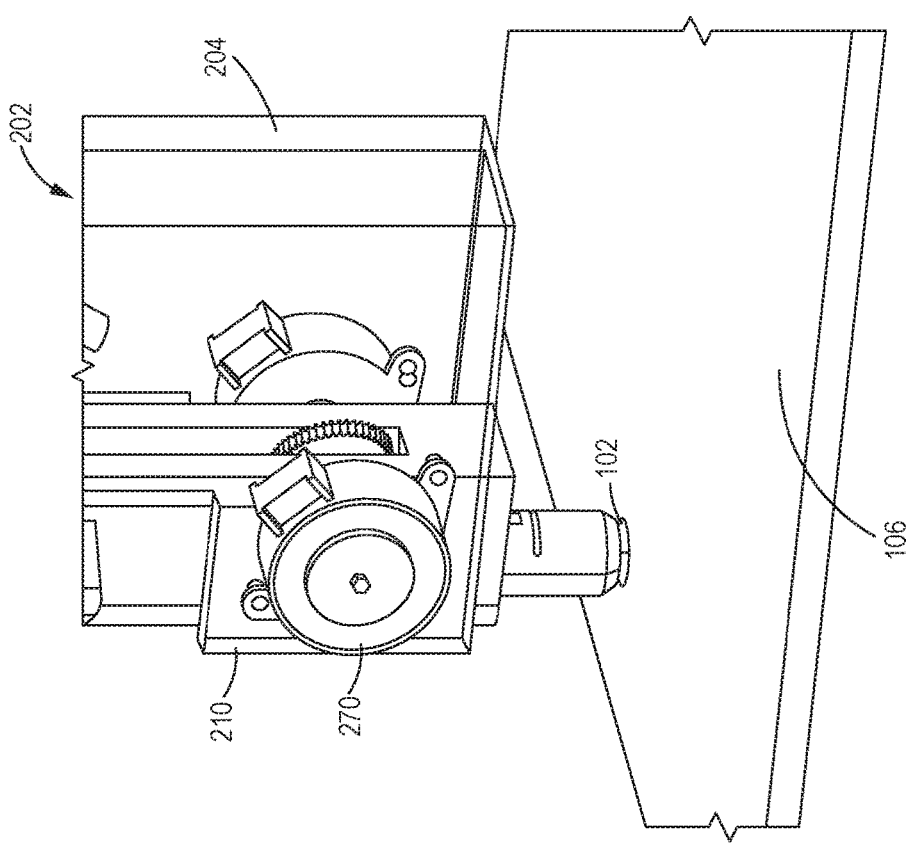
FIG. 12 is a schematic, perspective view of the apparatus of FIG. 1, according to one or more examples of the subject matter, disclosed herein.
Figure 14:
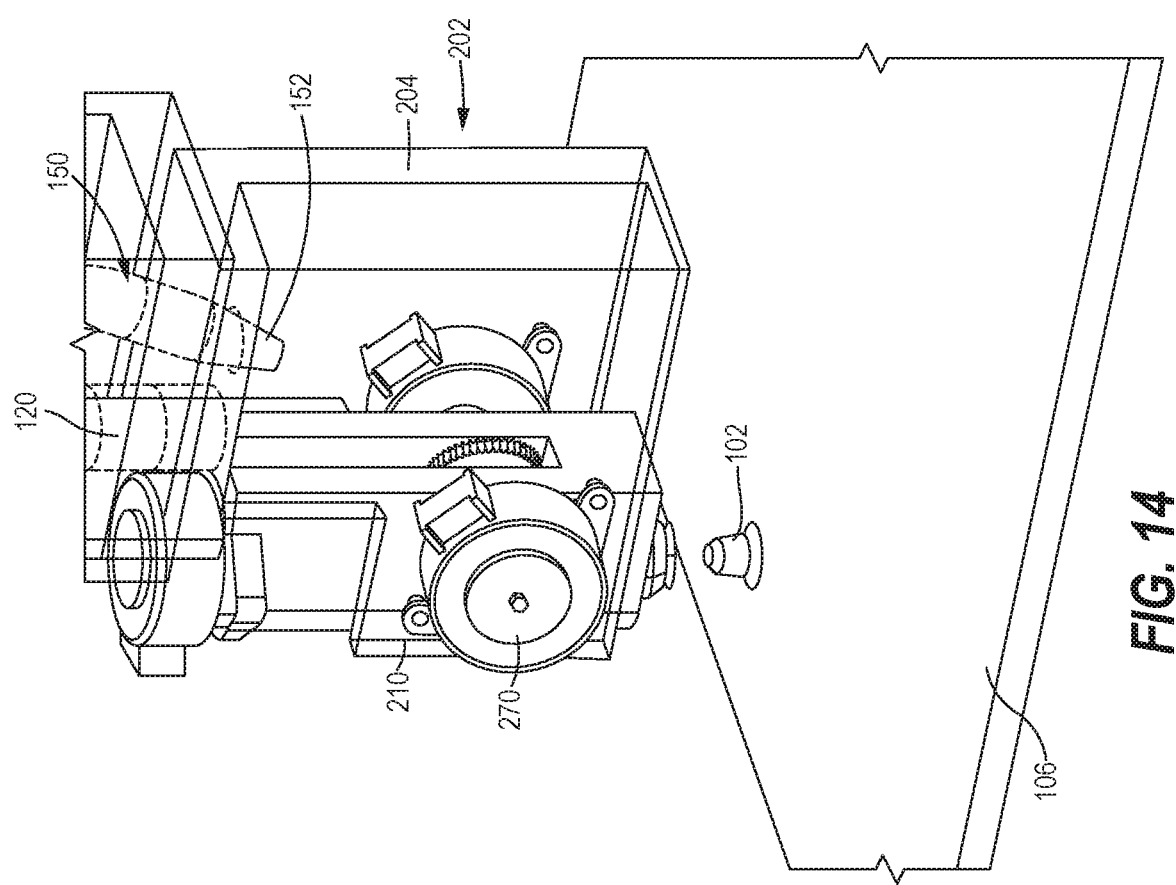
FIG. 14 is a schematic, perspective view of the apparatus of FIG. 1, according to one or more examples of the subject matter, disclosed herein.

Referring generally to FIG. 1 and particularly to, e.g., FIGS. 12-14 for illustrative purposes only and not by way of limitation, controller 300 is further programmed, after operating gripper motor 280 to rotate inner gripper 230 to the cap-releasing configuration, to operate gripper motor 280 to rotate inner gripper 230 through at least predetermined angle 249, prior to operating plunger-mechanism motor 270 to translate plunger mechanism 220 to the retracted position relative to main housing 210. The preceding portion of this paragraph characterizes example six of the subject matter, disclosed herein, where example six also encompasses example five, above.

Rotation of inner gripper 230 through predetermined angle 249, after operating gripper motor 280 to rotate inner gripper 230 to the cap-releasing configuration and prior to operating plunger-mechanism motor 270 to translate plunger mechanism 220 to the retracted position, more reliably installs pre-molded seal cap 102 onto one of fasteners 104. In addition, in examples where pre-molded seal cap 102 is filled with sealant 154, rotation of inner gripper cap 230 more evenly distributes sealant 154 over one of fasteners 104. Use of controller 300 to operate gripper motor 280 enables more precise and reliable rotation of inner gripper 230.

Referring generally to FIG. 1 and particularly to, e.g., FIG. 13 for illustrative purposes only and not by way of limitation, predetermined angle 249 is 360 degrees. The preceding portion of this paragraph characterizes example seven of the subject matter, disclosed herein, where example seven also encompasses example six, above.

Rotating inner gripper 230 through predetermined angle 249 of 360 degrees ensures that sealant 154 is distributed around the entire surface, and circumference, of one of fasteners 104.

Referring generally to FIG. 1 and particularly to, e.g., FIGS. 8-10 and 15-16 for illustrative purposes only and not by way of limitation, end effector 200 further comprises sealant dispenser 150, comprising nozzle 152, configured to discharge sealant 154. Housing motor 260 is further configured to rotate main housing 210 to sealant-receiving position, in which plunger mechanism 220 is aligned with nozzle 152 of sealant dispenser 150. The preceding portion of this paragraph characterizes example eight of the subject matter, disclosed herein, where example eight also encompasses example seven, above.

Sealant dispenser 150 enables automated filling of one of pre-molded seal caps 102 with sealant 154. Nozzle 152 of sealant dispenser 150 positively locates the position at which sealant 154 is discharged. Using housing motor 260 to rotate main housing 210 to sealant-receiving position enables more precise and reliable alignment of plunger mechanism 220 with nozzle 152 of sealant dispenser 150.

Figure 15:
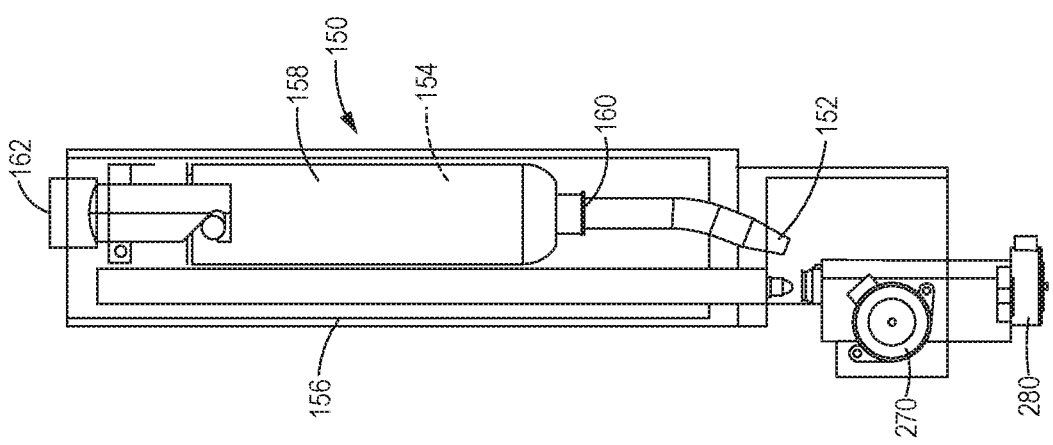
FIG. 15 is a schematic, elevation view of a sub-assembly of the apparatus of FIG. 1, according to one or more examples of the subject matter, disclosed herein.

Referring generally to FIG. 1 and particularly to, e.g., FIG. 15 for illustrative purposes only and not by way of limitation, sealant dispenser 150 comprises sealant-dispenser housing 156, configured to receive cartridge 158 that holds sealant 154. Cartridge 158 comprises cartridge outlet 160, configured to fluidically communicate with nozzle 152. Sealant dispenser 150 further comprises pressurized-air valve 162, configured to selectively pressurize cartridge 158, so that sealant 154 is dispensed through nozzle 152. The preceding portion of this paragraph characterizes example nine of the subject matter, disclosed herein, where example nine also encompasses example eight, above.

Sizing sealant-dispenser housing 156 to receive cartridge 158 permits sealant dispenser 150 to use commercially available, pre-packaged containers of sealant. Accordingly, the composition of sealant 154 is certified, and use of cartridge 158 reduces direct exposure of users to sealant material.

Figure 16:
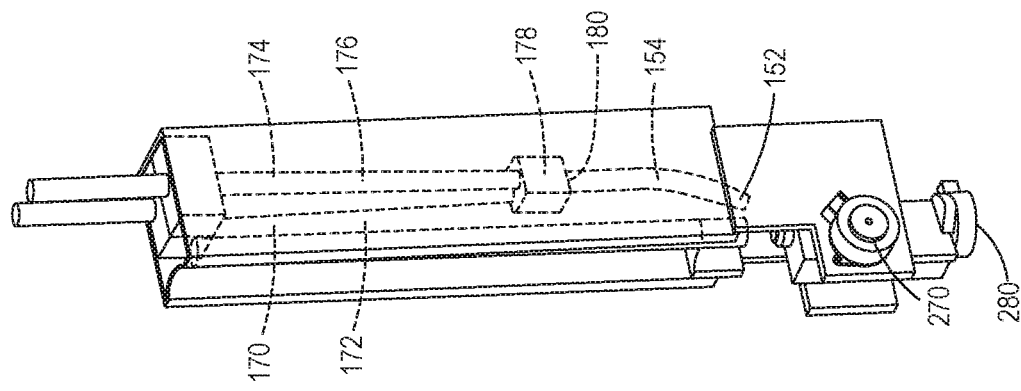
FIG. 16 is a schematic, perspective view of a sub-assembly of the apparatus of FIG. 1, according to one or more examples of the subject matter, disclosed herein.

Referring generally to FIG. 1 and particularly to, e.g., FIG. 16 for illustrative purposes only and not by way of limitation, sealant dispenser 150 comprises mixing block 178, first pressurized-sealant line 170, configured to deliver first sealant sub-composition 172 to mixing block 178, and second pressurized-sealant line 174, configured to deliver second sealant sub-composition 176 to mixing block 178. Mixing block 178 is configured to mix first sealant sub-composition 172 and second sealant sub-composition 176 to form sealant 154. Mixing block 178 comprises outlet 180 that fluidically communicates with nozzle 152. The preceding portion of this paragraph characterizes example ten of the subject matter, disclosed herein, where example ten also encompasses example eight, above.

Use of first pressurized-sealant line 170 holding first sealant sub-composition 172, and second pressurized-sealant line 174 holding second sealant sub-composition 176 reduces landfill requirements associated with cartridges and increases operational efficiency by eliminating the need to remove and replace cartridges.

Figure 8:
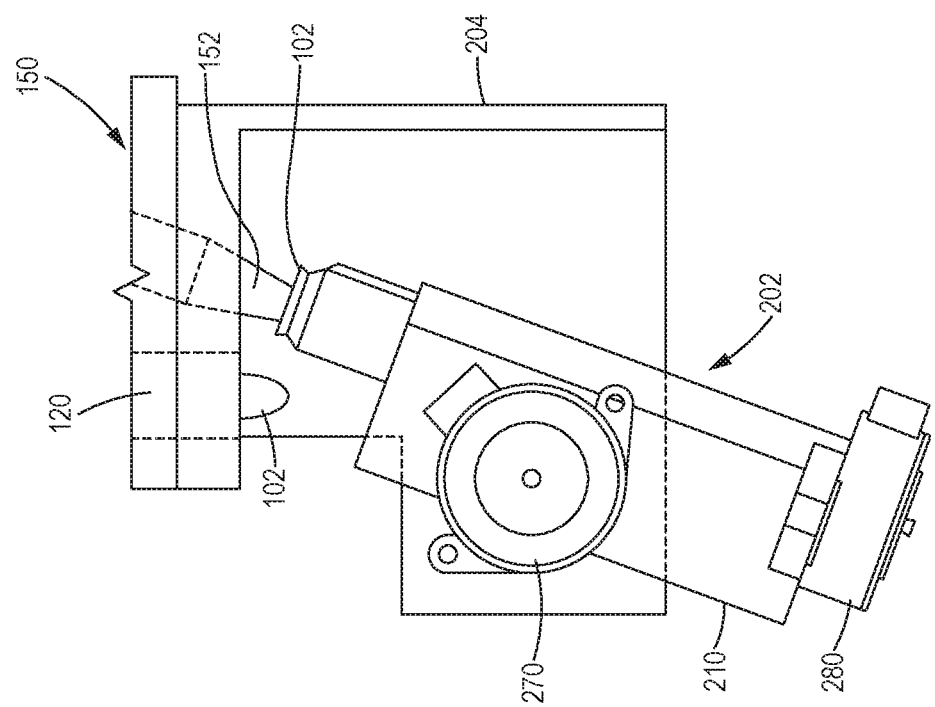
FIG. 8 is a schematic, elevation view of the apparatus of FIG. 1, according to one or more examples of the subject matter, disclosed herein.
Figure 9:
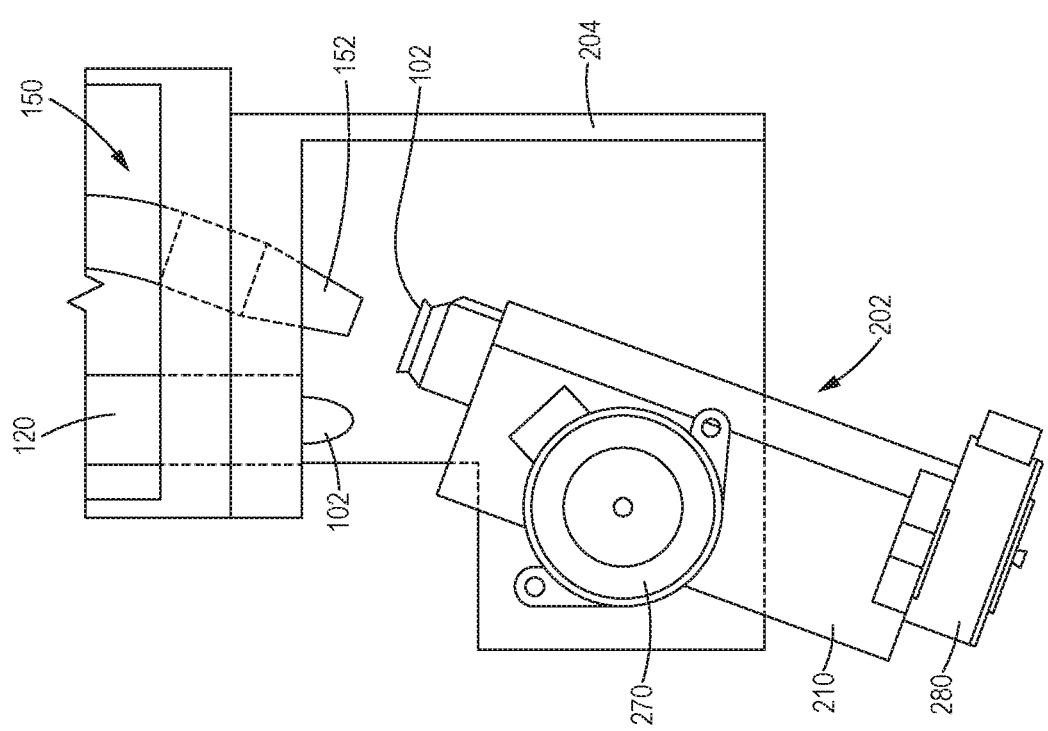
FIG. 9 is a schematic, elevation view of the apparatus of FIG. 1, according to one or more examples of the subject matter, disclosed herein.
Figure 11:
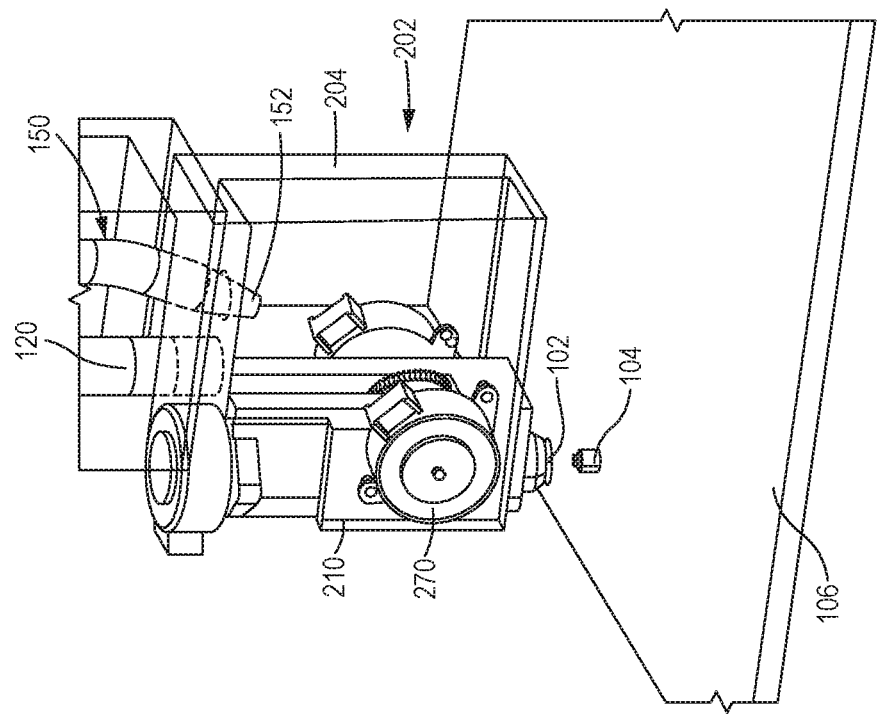
FIG. 11 is a schematic, perspective view of the apparatus of FIG. 1, according to one or more examples of the subject matter, disclosed herein.
Figure 10:
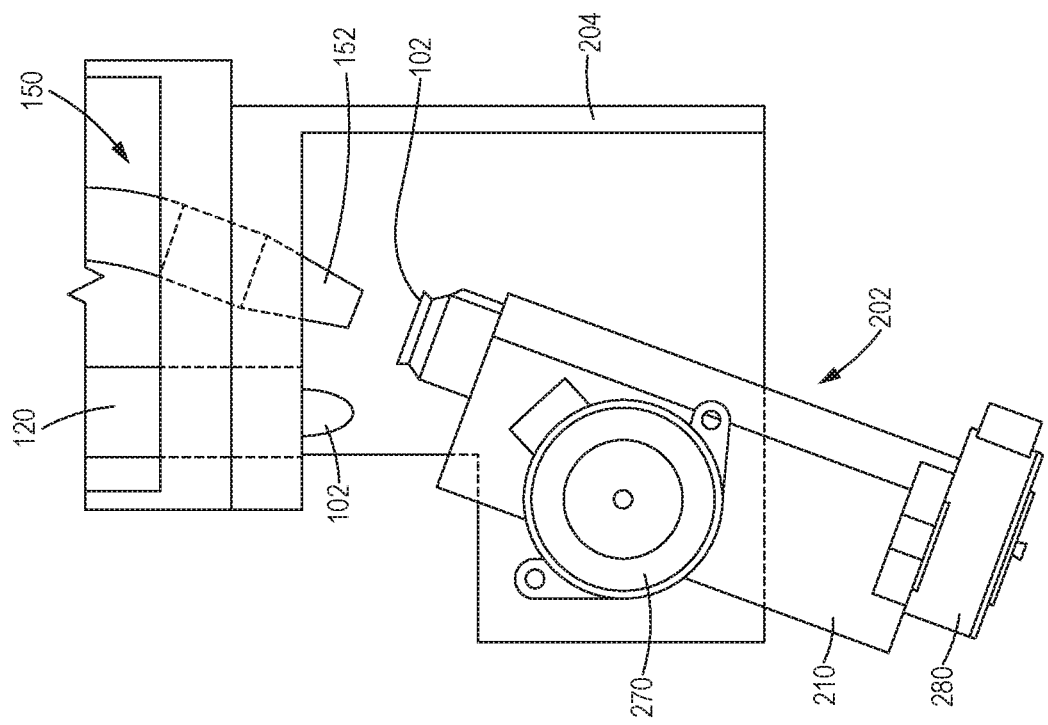
FIG. 10 is a schematic, elevation, view of the apparatus of FIG. 1, according to one or more examples of the subject matter, disclosed herein.

Referring generally to FIG. 1 and particularly to, e.g., FIGS. 8-10 for illustrative purposes only and not by way of limitation, controller 300 is further programmed, immediately prior to operating housing motor 260 to rotate main housing 210 to the cap-installing position, to operate housing motor 260 to rotate main housing 210 to sealant-receiving position, to operate plunger-mechanism motor 270 to translate plunger mechanism 220 to the extended position relative to main housing 210, so that inner gripper 230 is adjacent nozzle 152 of sealant dispenser 150, and to operate plunger-mechanism motor 270 to translate plunger mechanism 220 to the retracted position relative to main housing 210. The preceding portion of this paragraph characterizes example eleven of the subject matter, disclosed herein, where example eleven also encompasses any one of examples eight to ten, above.

Use of controller 300 to rotate main housing 210 to sealant-receiving position more reliably aligns plunger mechanism 220 with nozzle 152 of sealant dispenser 150 to fill one of pre-molded seal caps 102 with sealant 154. In one or more examples, controller 300 is programmed to automatically fill one of pre-molded seal caps 102 with sealant 154 by:
  operating housing motor 260 to rotate main housing 210 to sealant-receiving position, thereby to align plunger mechanism 220 with nozzle 152;
  operating plunger-mechanism motor 270 to translate plunger mechanism 220 to the extended position, so that inner gripper 230 is adjacent nozzle 152 of sealant dispenser, to facilitate discharge of sealant 154 into one of pre-molded seal caps 102; and
  operating plunger-mechanism motor 270 to translate plunger mechanism 220 to the retracted position, thereby to reduce potential interference during subsequent movement of main housing 210.

Referring generally to FIG. 1 and particularly to, e.g., FIGS. 8-10 for illustrative purposes only and not by way of limitation, controller 300 is operatively coupled to sealant dispenser 150. Controller 300 is further programmed to operate sealant dispenser 150 to dispense sealant 154 while inner gripper 230 is adjacent nozzle 152. The preceding portion of this paragraph characterizes example twelve of the subject matter, disclosed herein, where example twelve also encompasses example eleven, above.

Use of controller 300 to control dispensing of sealant 154 permits more reliable and precise automated filling of one of pre-molded seal caps 102 with sealant 154.

Figure 5:
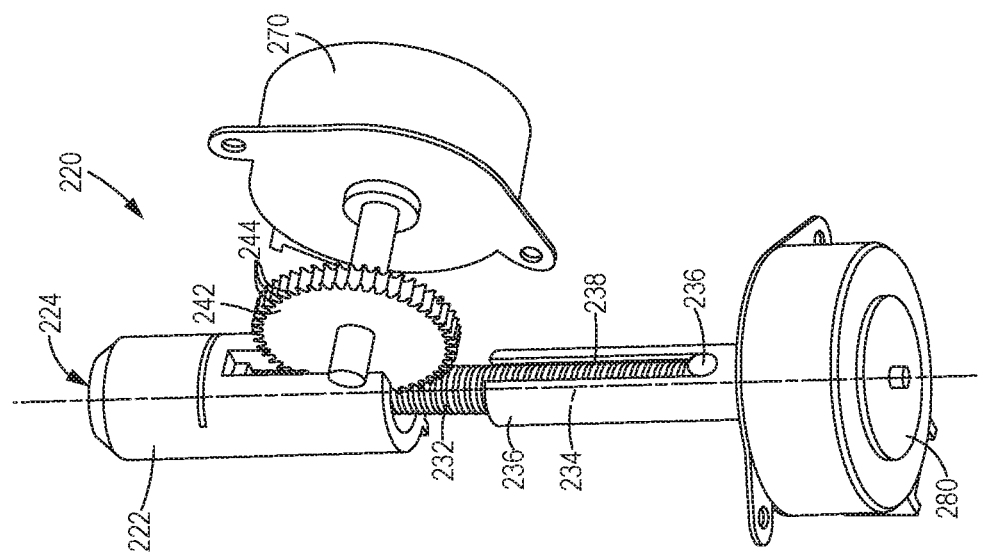
FIG. 5 is a schematic, perspective view of a sub-assembly of the apparatus of FIG. 1, according to one or more examples of the subject matter, disclosed herein.
Figure 4:
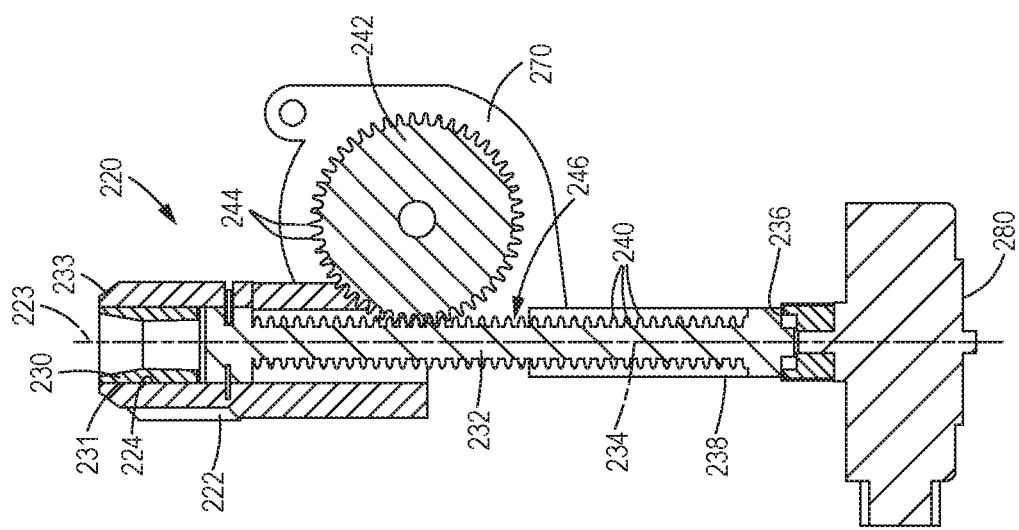
FIG. 4 is a schematic, elevation, sectional view of a sub-assembly of the apparatus of FIG. 1, according to one or more examples of the subject matter, disclosed herein.
Figure 7:
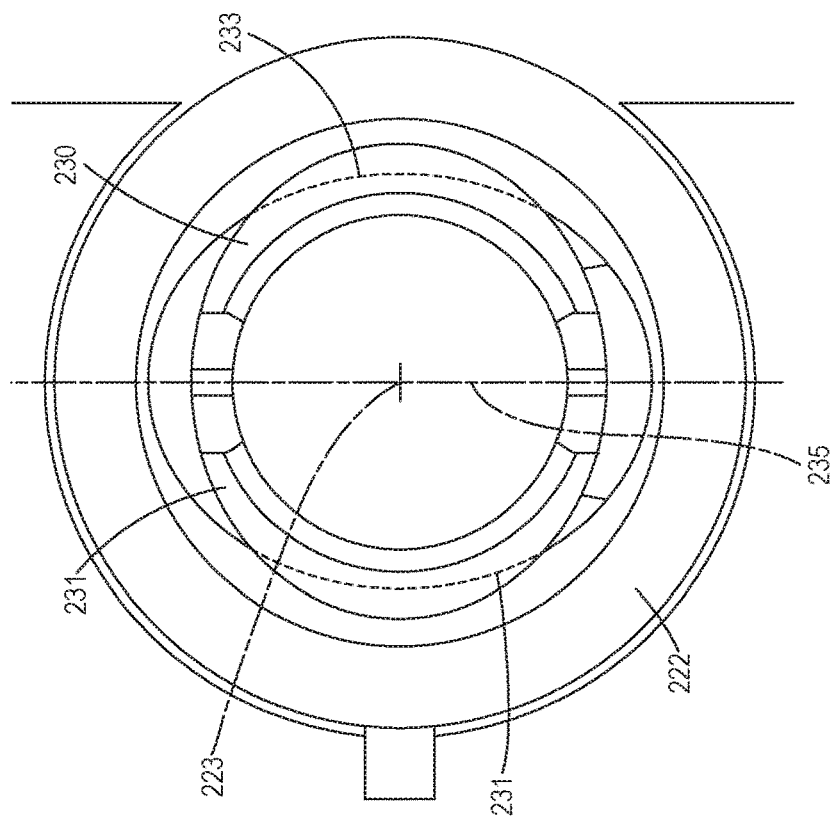
FIG. 7 is a schematic, plan view of a sub-assembly of the apparatus of FIG. 1, according to one or more examples of the subject matter, disclosed herein.
Figure 6:
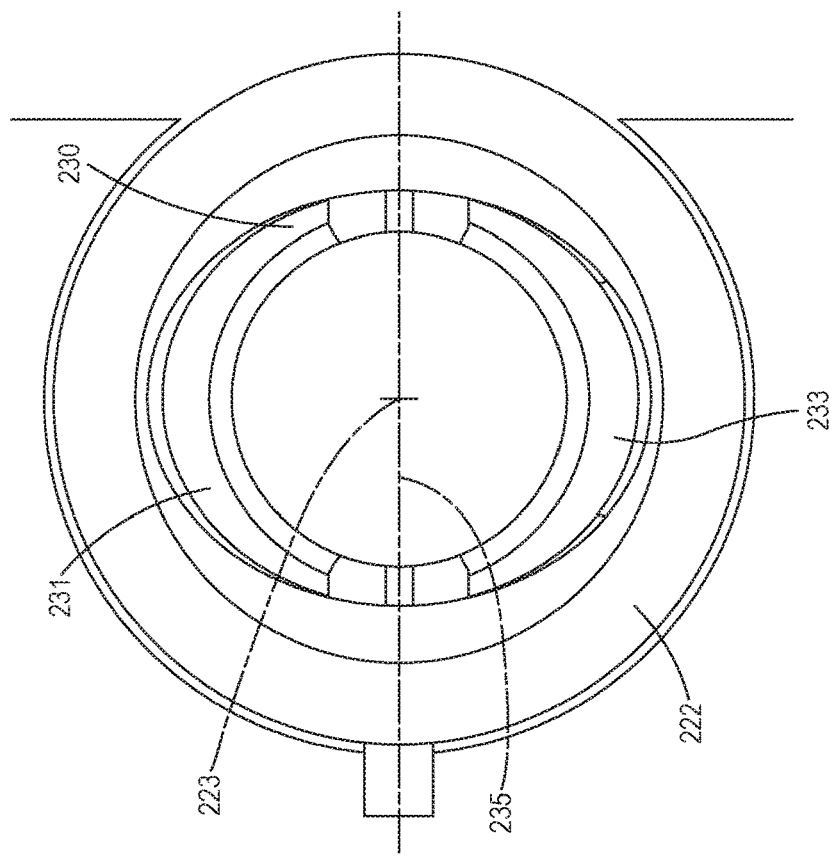
FIG. 6 is a schematic, plan view of a sub-assembly of the apparatus of FIG. 1, according to one or more examples of the subject matter, disclosed herein.

Referring generally to FIG. 1 and particularly to, e.g., FIGS. 3-5 for illustrative purposes only and not by way of limitation, plunger mechanism 220 further comprises ribbed shaft 232, coupled to inner gripper 230. The preceding portion of this paragraph characterizes example thirteen of the subject matter, disclosed herein, where example thirteen also encompasses any one of examples five to twelve, above.

Use of ribbed shaft 232 coupled to inner gripper 230 facilitates mechanical interface of inner gripper 230 with plunger-mechanism motor 270 and gripper motor 280.

Referring generally to FIG. 1 and particularly to, e.g., FIGS. 3-5 for illustrative purposes only and not by way of limitation, plunger-mechanism motor 270 is operably coupled to ribbed shaft 232. The preceding portion of this paragraph characterizes example fourteen of the subject matter, disclosed herein, where example fourteen also encompasses example thirteen, above.

Operably coupling ribbed shaft 232 with plunger-mechanism motor 270 increases the range between the retracted position and the extended position of plunger mechanism 220.

Referring generally to FIG. 1 and particularly to, e.g., FIGS. 3-5 for illustrative purposes only and not by way of limitation, ribbed shaft 232 has ribbed-shaft central axis 234. Ribbed shaft 232 further comprises projection 236, extending perpendicular to ribbed-shaft central axis 234. The preceding portion of this paragraph characterizes example fifteen of the subject matter, disclosed herein, where example fifteen also encompasses example fourteen, above.

Use of projection 236 on ribbed shaft 232 facilitates mechanical interface of gripper motor 280 with inner gripper 230.

Referring generally to FIG. 1 and particularly to, e.g., FIGS. 4-5 for illustrative purposes only and not by way of limitation, cap-placement assembly 202 further comprises rotation sleeve 237, coupled to gripper motor 280. Rotation sleeve 237 is configured to rotate responsive to controller 300 operating gripper motor 280. Rotation sleeve 237 comprises elongate slot 238, extending parallel to ribbed-shaft central axis 234, and elongate slot 238 is configured to mechanically engage projection 236 of ribbed shaft 232. Ribbed shaft 232 and inner gripper 230 are configured to rotate responsive to rotation sleeve 237 being rotated by gripper motor 280. The preceding portion of this paragraph characterizes example sixteen of the subject matter, disclosed herein, where example sixteen also encompasses example fifteen, above.

Use of rotation sleeve 237 with elongate slot 238 further facilitates mechanical interface of gripper motor 280 with inner gripper 230 without interfering with translation of plunger mechanism 220. Specifically, mechanical engagement of elongate slot 238 with projection 236 rotationally couples rotation sleeve 237 to ribbed shaft 232, thereby permitting gripper motor 280 to rotate inner gripper 230. Extension of elongate slot 238 parallel to ribbed-shaft central axis 234 maintains mechanical engagement of elongate slot 238 while permitting ribbed shaft 232 to translate in response to operation of plunger-mechanism motor 270.

Referring generally to FIG. 1 and particularly to, e.g., FIG. 4 for illustrative purposes only and not by way of limitation, ribbed shaft 232 comprises discrete, circumferentially closed ribs 240. Each of discrete, circumferentially closed ribs 240 extends perpendicular to ribbed-shaft central axis 234. The preceding portion of this paragraph characterizes example seventeen of the subject matter, disclosed herein, where example seventeen also encompasses example fifteen or sixteen, above.

Use of discrete, circumferentially closed ribs 240 facilitates mechanical coupling of ribbed shaft 232 to plunger-mechanism motor 270.

Referring generally to FIG. 1 and particularly to, e.g., FIGS. 2-5 for illustrative purposes only and not by way of limitation, plunger mechanism 220 further comprises gripper gear 242, coupled to plunger-mechanism motor 270. Gripper gear 242 comprises gear teeth 244, configured to mesh with discrete, circumferentially closed ribs 240. The preceding portion of this paragraph characterizes example eighteen of the subject matter, disclosed herein, where example eighteen also encompasses example seventeen, above.

Use of gripper gear 242 with gear teeth 244 meshing with spaces 246 enables precise mechanical coupling of plunger-mechanism motor 270 to ribbed shaft 232, thereby minimizing lost motion during translation of plunger mechanism 220.

Figure 17:
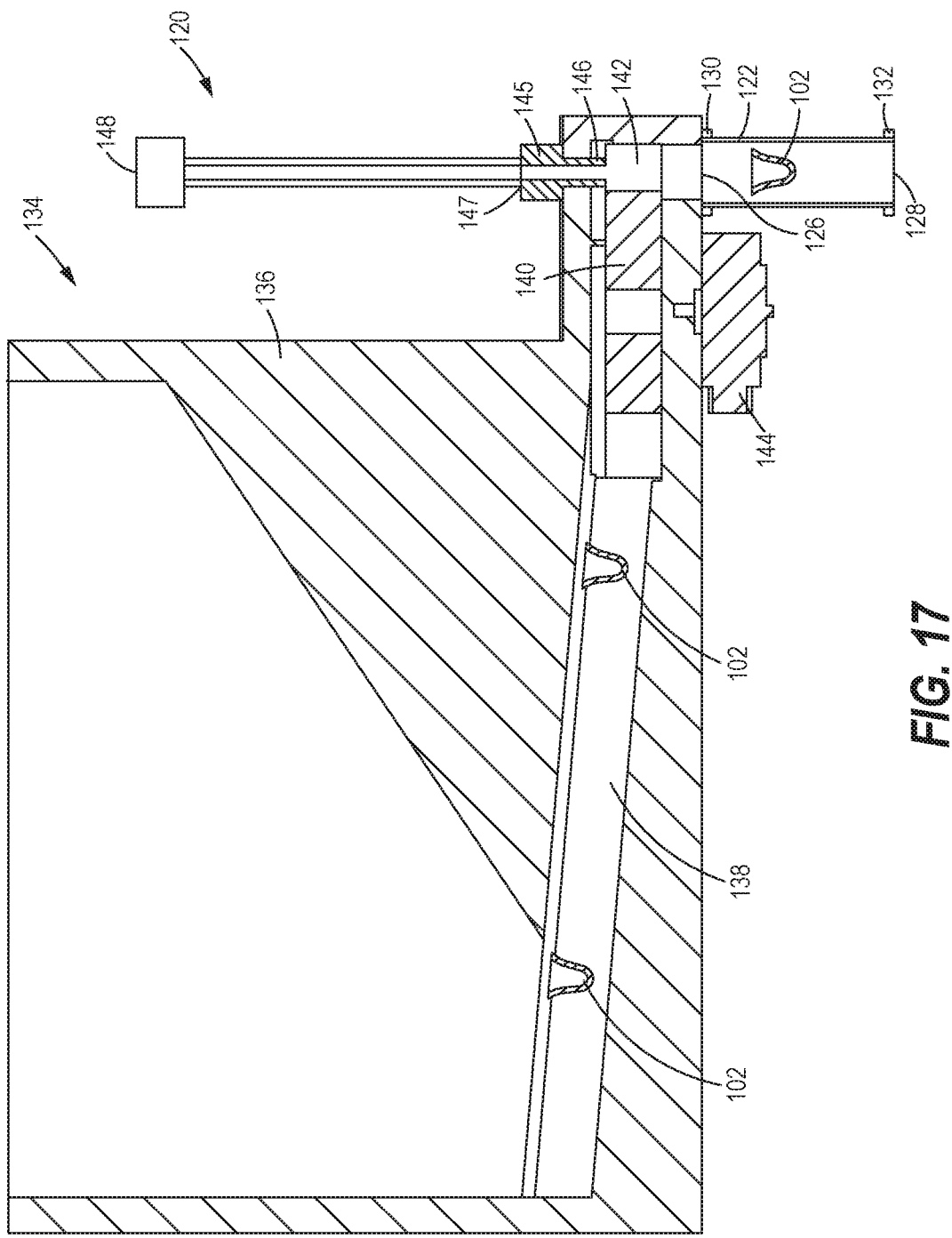
FIG. 17 is a schematic, elevation, sectional view of a sub-assembly of the apparatus of FIG. 1, according to one or more examples of the subject matter, disclosed herein.
Figure 18:
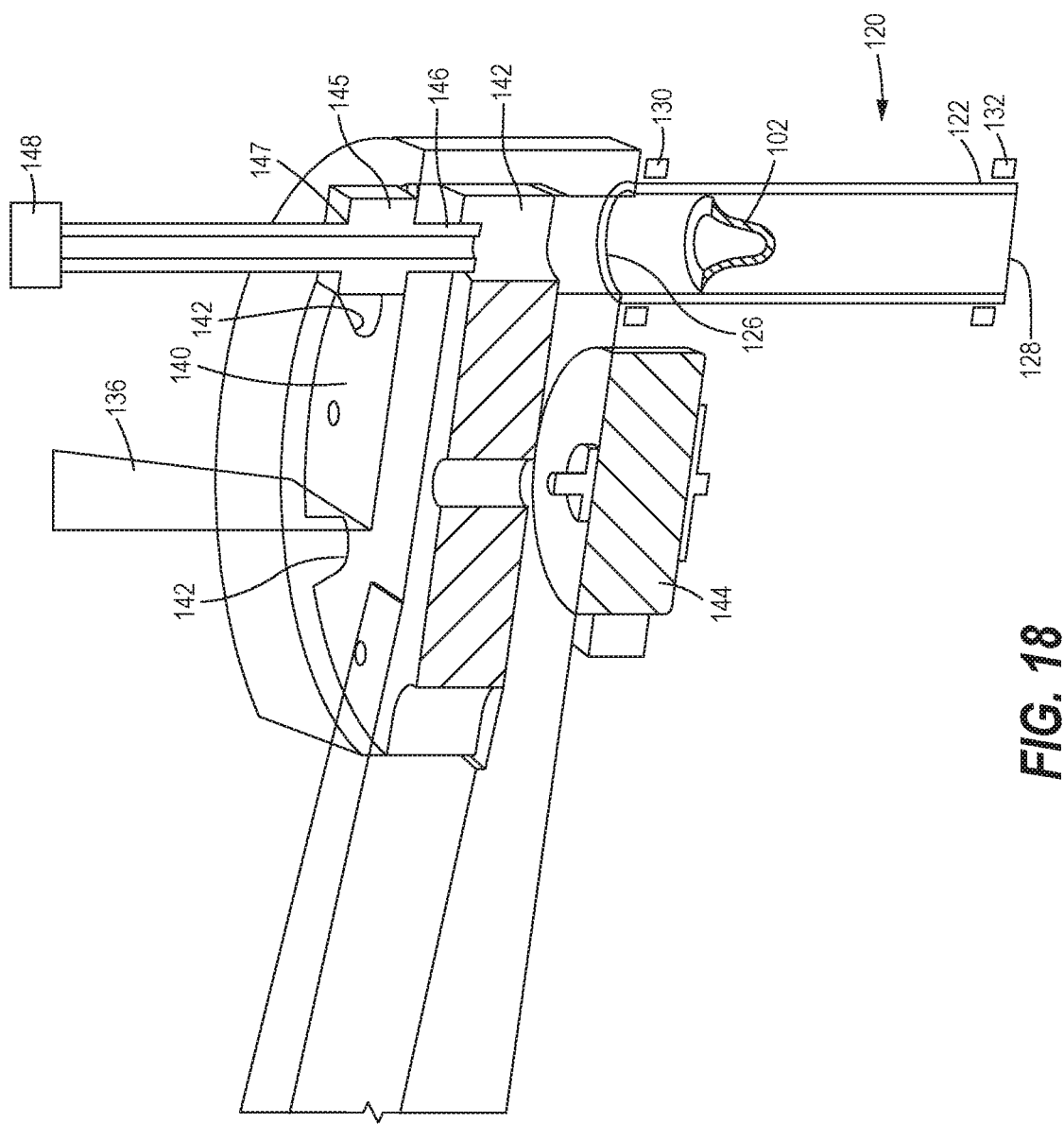
FIG. 18 is a schematic, perspective, sectional view of a sub-assembly of the apparatus of FIG. 1, according to one or more examples of the subject matter, disclosed herein.

Referring generally to FIG. 1 and particularly to, e.g., FIGS. 2 and 17-18 for illustrative purposes only and not by way of limitation, seal-cap-delivery sleeve 122 of cap-dispenser assembly 120 comprises seal-cap-delivery-sleeve inlet 126 and seal-cap-delivery-sleeve outlet 128. Seal-cap-delivery-sleeve outlet 128 is positioned closer to cap-placement assembly 202 than to seal-cap-delivery-sleeve inlet 126. The preceding portion of this paragraph characterizes example nineteen of the subject matter, disclosed herein, where example nineteen also encompasses any one of examples one to eighteen, above.

Use of seal-cap-delivery sleeve 122 permits a plurality of pre-molded seal caps 102 to be available for installation by end effector 200, thereby allowing more rapid installation of a plurality of pre-molded seal caps 102 onto a plurality of fasteners 104.

Referring generally to FIG. 1 and particularly to, e.g., FIG. 2 for illustrative purposes only and not by way of limitation, when main housing 210 is in the cap-receiving position, and when plunger mechanism 220 is in the extended position relative to main housing 210, plunger mechanism 220 is adjacent seal-cap-delivery-sleeve outlet 128. The preceding portion of this paragraph characterizes example twenty of the subject matter, disclosed herein, where example twenty also encompasses example nineteen, above.

Positioning plunger mechanism 220 adjacent seal-cap-delivery-sleeve outlet 128 enables more reliable grasping and removing of a leading one of pre-molded seal caps 102 from seal-cap-delivery sleeve 122.

Referring generally to FIG. 1 and particularly to, e.g., FIGS. 17-18 for illustrative purposes only and not by way of limitation, end effector 200 further comprises high-level cap sensor 130, configured to detect when one of pre-molded seal caps 102 in seal-cap-delivery sleeve 122 is at a predetermined location, adjacent seal-cap-delivery-sleeve inlet 126. The preceding portion of this paragraph characterizes example twenty-one of the subject matter, disclosed herein, where example twenty-one also encompasses example nineteen or twenty, above.

Use of high-level cap sensor 130 provides an indication of the number of pre-molded seal caps 102, stored in seal-cap-delivery sleeve 122. Presence of pre-molded seal caps 102 at seal-cap-delivery-sleeve inlet 126 indicates that a supply of pre-molded seal caps 102 is available for cap-placement assembly 202. Absence of pre-molded seal caps 102 at seal-cap-delivery-sleeve inlet 126 indicates a demand for pre-molded seal caps 102 to be added to seal-cap-delivery sleeve 122. Accordingly, high-level cap sensor 130 enables more continuous operation of end effector 200 by providing an advance indication of a need for more pre-molded seal caps 102 in seal-cap-delivery sleeve 122. As used herein, the term "adjacent" means a distance approximately equal to a height of one of pre-molded seal caps 102. Accordingly, in various examples, high-level cap sensor 130 detects when one of pre-molded seal caps 102 is present within a portion of seal-cap-delivery sleeve 122 that extends from seal-cap-delivery-sleeve inlet 126 to a point that is spaced from seal-cap-delivery-sleeve inlet 126 by a distance, equal to a height of one of pre-molded seal caps 102.

Referring generally to FIG. 1 and particularly to, e.g., FIGS. 17-18 for illustrative purposes only and not by way of limitation, end effector 200 further comprises low-level cap sensor 132, configured to detect when one of pre-molded seal caps 102 in seal-cap-delivery sleeve 122 is at a predetermined location adjacent seal-cap-delivery-sleeve outlet 128. The preceding portion of this paragraph characterizes example twenty-two of the subject matter, disclosed herein, where example twenty-two also encompasses any one of examples nineteen to twenty-one, above.

Use of low-level cap sensor 132 provides an indication that none of pre-molded seal caps 102 is available for cap-placement assembly 202. An indication from low-level cap sensor 132 that none of pre-molded seal caps 102 are present in seal-cap-delivery sleeve 122 enables a user to immediately cease operation, thereby avoiding wasted time on ineffective operation of end effector 200. As used herein, the term "adjacent" means a distance, approximately equal to a height of one of pre-molded seal caps 102. Accordingly, in various examples, low-level cap sensor 132 detects when one of pre-molded seal caps 102 is present within a portion of seal-cap-delivery sleeve 122 that extends from seal-cap-delivery-sleeve outlet 128 to a point that is spaced from seal-cap-delivery-sleeve outlet 128 by a distance, equal to a height of one of pre-molded seal caps 102.

Referring generally to FIG. 1 and particularly to, e.g., FIGS. 17-18 for illustrative purposes only and not by way of limitation, cap-dispenser assembly 120 further comprises hopper assembly 134, configured to feed pre-molded seal caps 102 into seal-cap-delivery-sleeve inlet 126. The preceding portion of this paragraph characterizes example twenty-three of the subject matter, disclosed herein, where example twenty-three also encompasses any one of examples nineteen to twenty-two, above.

Use of hopper assembly 134 enables a more continuous feed of pre-molded seal caps 102 to seal-cap-delivery-sleeve inlet 126, thereby ensuring a constant supply of pre-molded seal caps 102 in seal-cap-delivery sleeve 122 that are available for use by cap-placement assembly 202.

Referring generally to FIG. 1 and particularly to, e.g., FIGS. 17-18 for illustrative purposes only and not by way of limitation, hopper assembly 134 comprises hopper 136, comprising slotted feed ramp 138. Hopper assembly 134 further comprises feed disc 140, rotatable relative to hopper 136 and comprising cap-receiving slot 142, configured to receive one of pre-molded seal caps 102. Hopper assembly 134 also comprises feed motor 144, configured to rotate feed disc 140 from cap-feeding position, in which cap-receiving slot 142 is aligned with slotted feed ramp 138, to cap-dispensing position, in which cap-receiving slot 142 is aligned with seal-cap-delivery-sleeve inlet 126. The preceding portion of this paragraph characterizes example twenty-four of the subject matter, disclosed herein, where example twenty-four also encompasses example twenty-three, above.

Use of slotted feed ramp 138 places pre-molded seal caps 102 in proper orientation for transfer into seal-cap-delivery sleeve 122. Use of feed disc 140 positively locates each one of pre-molded seal caps 102 during transfer from hopper 136 to seal-cap-delivery sleeve 122. Use of feed motor 144 enables more precise control and timing of transfer of each one of pre-molded seal caps 102 from hopper 136 to seal-cap-delivery sleeve 122.

Referring generally to FIG. 1 and particularly to, e.g., FIGS. 17-18 for illustrative purposes only and not by way of limitation, hopper assembly 134 further comprises air valve 145. Air valve 145 comprises valve outlet 146, aligned with cap-receiving slot 142 when feed disc 140 is in cap-dispensing position and aligned with seal-cap-delivery-sleeve inlet 126. Air valve 145 also comprises valve inlet 147, which is in fluidic communication with valve outlet 146. The preceding portion of this paragraph characterizes example twenty-five of the subject matter, disclosed herein, where example twenty-five also encompasses example twenty-four, above.

Use of air valve 145 more precisely and reliably discharges one of pre-molded seal caps 102 from cap-receiving slot 142 into seal-cap-delivery sleeve 122. In various examples, air valve 145 is in fluidic communication with pressurized air source 148. Accordingly, air valve 145 is selectively operable to discharge pressurized air toward cap-receiving slot 142 when feed disc 140 is in cap-dispensing position. The pressurized air impacts one of pre-molded seal caps 102 disposed in cap-receiving slot 142 with sufficient force to push one of pre-molded seal caps 102 out of cap-receiving slot 142 and into seal-cap-delivery-sleeve inlet 126.

Referring generally to FIG. 1 and particularly to, e.g., FIGS. 2-7 and 11-12 for illustrative purposes only and not by way of limitation, system 100 for installing pre-molded seal caps 102 onto fasteners 104 that extend from surface 106 is disclosed. System 100 comprises end effector 200. End effector 200 comprises frame 204, cap-dispenser assembly 120, and cap-placement assembly 202. Cap-dispenser assembly 120 is coupled to frame 204 and comprises seal-cap-delivery sleeve 122, having seal-cap-delivery-sleeve central axis 124. Cap-placement assembly 202 is coupled to frame 204 and is rotatable relative to frame 204. Cap-placement assembly 202 comprises main housing 210 and plunger mechanism 220, coupled to main housing 210. Plunger mechanism 220 comprises outer plunger housing 222, comprising interior chamber 224 that has interior-chamber central axis 223. Plunger mechanism 220 also comprises inner gripper 230, at least portion of which is located in interior chamber 224 of outer plunger housing 222. Inner gripper 230 comprises first finger 231 and second finger 233, with first finger 231 and second finger 233 opposite each other along finger axis 235, perpendicular to interior-chamber central axis 223. Inner gripper 230 is rotatable relative to outer plunger housing 222, within interior chamber 224, between a cap-retaining configuration and a cap-releasing configuration. First finger 231 and second finger 233 are closer to each other in the cap-retaining configuration than in the cap-releasing configuration. Plunger mechanism 220 is selectively translatable, relative to main housing 210, from an extended position to a retracted position and from the retracted position to the extended position. Outer plunger housing 222 of plunger mechanism 220 protrudes farther from main housing 210 when plunger mechanism 220 is in the extended position than when plunger mechanism 220 is in the retracted position. Main housing 210 is selectively rotatable from a cap-receiving position, in which plunger mechanism 220 is aligned with seal-cap-delivery-sleeve central axis 124 to a cap-installing position, in which main housing 210 is angularly displaced from the cap-receiving position, and from the cap-installing position to cap-receiving position. System 100 further comprises controller 300, operatively coupled to end effector 200, and robot 110, supporting end effector 200 and controller 300. The preceding portion of this paragraph characterizes example twenty-six of the subject matter, disclosed herein.

System 100 enables a plurality of pre-molded seal caps 102 to be sequentially installed on a plurality of fasteners 104. End effector 200 is able to automatically install one of pre-molded seal caps 102 onto one of fasteners 104 that extend from surface 106, thereby minimizing the amount of manual labor. Use of frame 204 provides structure for supporting components of end effector 200. Cap-dispenser assembly 120 enables a plurality of pre-molded seal caps 102 to be obtained by end effector 200. Specifically, cap-dispenser assembly 120 includes seal-cap-delivery sleeve 122 having seal-cap-delivery-sleeve central axis 124, which positively locates the position, at which each one of pre-molded seal caps 102 is provided and obtained by end effector 200.

Cap-placement assembly 202, which is coupled to frame 204, and is rotatable relative to frame 204, enables end effector 200 to obtain one of pre-molded seal caps 102 from cap-dispenser assembly 120 and to install one of pre-molded seal caps 102 on one of fasteners 104. The use of main housing 210 provides primary structure for supporting components of cap-dispenser assembly 120. Plunger mechanism 220 selectively grasps, positions, and releases one of pre-molded seal caps 102 during operation of end effector 200. Outer plunger housing 222 of plunger mechanism 220 provides interior chamber 224, with interior-chamber central axis 223, for enclosing and interacting with inner gripper 230, of which at least a portion is located in interior chamber 224 of outer plunger housing 222. First finger 231 and second finger 233 of inner gripper 230 are selectively actuatable to grasp or release one of pre-molded seal caps 102. Specifically, first finger 231 and second finger 233 are opposite each other along finger axis 235, which is perpendicular to interior-chamber central axis 223, and inner gripper 230 is rotatable relative to outer plunger housing 222, within interior chamber 224, between the cap-retaining configuration for grasping one of pre-molded seal caps 102, and the cap-releasing configuration for releasing one of pre-molded seal caps 102. Interior chamber 224 of outer plunger housing 222 is shaped so that first finger 231 and second finger 233 are closer to each other in the cap-retaining configuration than in the cap-releasing configuration.

In one or more examples, outer plunger housing 222 and inner gripper 230 interact to selectively place inner gripper in the cap-retaining configuration and the cap-releasing configuration. For example, interior chamber 224 has an elliptical cross-sectional shape defining an outer-plunger-housing major-ellipse dimension and an outer-plunger-housing minor-ellipse dimension. First finger 231 and second finger 233 similarly are contoured to define an inner-gripper major-ellipse dimension and an inner-gripper minor-ellipse dimension. In the cap-releasing configuration, inner gripper 230 is positioned so that the inner-gripper major-ellipse dimension is aligned with outer-plunger-housing major-ellipse dimension. When rotated to the cap-retaining configuration, inner-gripper major-ellipse dimension is aligned with outer-plunger-housing major-ellipse dimension, which deflects first finger 231 and second finger 233 inwardly toward finger axis 235. Accordingly, rotation of inner gripper 230 from the cap-releasing configuration to the cap-retaining configuration enables inner gripper 230 to selectively retain one of pre-molded seal caps 102 between first finger 231 and second finger 233.

Plunger mechanism 220 is translatable, relative to main housing 210, between, inclusively, the extended position and the retracted position to position one of pre-molded seal caps 102 during operation of end effector 200. Specifically, outer plunger housing 222 of plunger mechanism 220 protrudes farther from main housing 210 when plunger mechanism 220 is in the extended position than when plunger mechanism 220 is in the retracted position, to place one of pre-molded seal caps 102 in position to interact with other components of end effector 200 and fasteners 104. The retracted position of plunger mechanism 220 facilitates rotation of cap-placement assembly 202 by minimizing possibility of mechanical interference with components of end effector 200 and surrounding environment.

Use of rotatable main housing 210 enables cap-placement assembly 202 to interact with other components of end effector 200 and fasteners 104. The cap-receiving position of main housing 210 aligns plunger mechanism 220 with seal-cap-delivery-sleeve central axis 124 to allow one of pre-molded seal caps 102 to be obtained from cap-dispenser assembly 120. The cap-installing position of main housing 210 is angularly displaced from the cap-receiving position, to permit one of pre-molded seal caps 102 to be installed on one of fasteners 104. Use of controller 300 enables programmable operation of end effector 200.

Use of robot 110 to support end effector 200 and controller 300 enables system 100 to rapidly install, in sequence, a plurality of pre-molded seal caps 102 onto a plurality of fasteners 104. Robot 110 repositions end effector 200 over surface 106, thereby placing cap-placement assembly 202 over a first one of fasteners 104. After installing one of pre-molded seal caps 102 on the first one of fasteners 104, robot 110 enables end effector 200 to be repositioned over a second one of fasteners 104 to install one of pre-molded seal caps 102 on the second one of fasteners 104. Robot 110 further permits end effector 200 to be repositioned over a third and subsequent ones of fasteners 104, to allow end effector 200 to install additional ones of pre-molded seal caps 102.

Referring generally to FIG. 1 and particularly to, e.g., FIGS. 2-3 for illustrative purposes only and not by way of limitation, cap-placement assembly 202 further comprises housing motor 260, configured to selectively rotate main housing 210 from the cap-receiving position to the cap-installing position and from the cap-installing position to the cap-receiving position. The preceding portion of this paragraph characterizes example twenty-seven of the subject matter, disclosed herein, where example twenty-seven also encompasses example twenty-six, above.

Use of housing motor 260 enables automatic rotation of main housing 210 without requiring manual positioning. Using housing motor 260 to rotate main housing 210 between the cap-receiving position and the cap-installing position enables more precise and reliable positioning of main housing during operation of end effector 200.

Generally, in various examples, housing motor 260 includes an output shaft that is rotatable by housing motor 260 to produce rotary force or torque when housing motor 260 is operated. In various examples, housing motor 260 is any one of various rotational motors, such as an electric motor, a hydraulic motor, a pneumatic motor, an electromagnetic motor, and the like. In various examples, housing motor 260 is coupled to main housing 210.

Referring generally to FIG. 1 and particularly to, e.g., FIGS. 2-5, 11-12, and 14 for illustrative purposes only and not by way of limitation, cap-placement assembly 202 further comprises plunger-mechanism motor 270, configured to selectively translate plunger mechanism 220 from the extended position to the retracted position relative to main housing 210 and from the retracted position to the extended position. The preceding portion of this paragraph characterizes example twenty-eight of the subject matter, disclosed herein, where example twenty-eight also encompasses example twenty-seven, above.

Use of plunger-mechanism motor 270 enables automatic translation of plunger mechanism 220 without requiring manual positioning. Using plunger-mechanism motor 270 to translate plunger mechanism 220 between the extended position and the retracted position enables more precise and reliable positioning of plunger mechanism 220 during operation of end effector 200.

Generally, in various examples, plunger-mechanism motor 270 includes an output shaft that is rotatable by plunger-mechanism motor 270 to produce rotary force or torque when plunger-mechanism motor 270 is operated. In various examples, plunger-mechanism motor 270 is any one of various rotational motors, such as an electric motor, a hydraulic motor, a pneumatic motor, an electromagnetic motor, and the like. In various examples, plunger-mechanism motor 270 is coupled to plunger mechanism 220.

Referring generally to FIG. 1 and particularly to, e.g., FIGS. 2-5 and 14 for illustrative purposes only and not by way of limitation, cap-placement assembly 202 further comprises gripper motor 280, configured to rotate inner gripper 230 from the cap-retaining configuration to the cap-releasing configuration and from the cap-releasing configuration to the cap-retaining configuration. The preceding portion of this paragraph characterizes example twenty-nine of the subject matter, disclosed herein, where example twenty-nine also encompasses example twenty-eight, above.

Use of gripper motor 280 enables automatic rotation of inner gripper 230 within outer plunger housing 222. Using gripper motor 280 to rotate inner gripper 230 between the cap-retaining configuration and the cap-releasing configuration enables more precise and reliable positioning of inner gripper 230 during operation of end effector 200.

Generally, in various examples, gripper motor 280 includes an output shaft that is rotatable by gripper motor 280 to produce rotary force or torque when gripper motor 280 is operated. In various examples, gripper motor 280 is any one of various rotational motors, such as an electric motor, a hydraulic motor, a pneumatic motor, an electromagnetic motor, and the like. In various examples, gripper motor 280 is coupled to inner gripper 230.

Referring generally to FIG. 1 and particularly to, e.g., FIGS. 2, 11-12, and 14 for illustrative purposes only and not by way of limitation, system 100 further comprises controller 300, operably coupled to housing motor 260, plunger-mechanism motor 270, and gripper motor 280. Controller 300 is programmed to operate housing motor 260 to rotate main housing 210 to the cap-receiving position. Additionally, controller 300 is programmed to operate plunger-mechanism motor 270 to translate plunger mechanism 220 to the extended position relative to main housing 210, so that inner gripper 230 is adjacent cap-dispenser assembly 120. Still further, controller 300 is programmed to operate gripper motor 280 to rotate inner gripper 230 to the cap-retaining configuration, and plunger-mechanism motor 270 to translate plunger mechanism 220 to the retracted position relative to main housing 210. In addition, controller 300 is programmed to operate housing motor 260 to rotate main housing 210 to the cap-installing position, to operate plunger-mechanism motor 270 to translate plunger mechanism 220 to the extended position relative to main housing 210, and to operate gripper motor 280 to rotate inner gripper 230 to the cap-releasing configuration. Also, controller 300 is programmed to operate plunger-mechanism motor 270 to translate plunger mechanism 220 to the retracted position relative to main housing 210. The preceding portion of this paragraph characterizes example thirty of the subject matter, disclosed herein, where example thirty also encompasses example twenty-nine, above.

Use of controller 300 enables programmable operation of end effector 200. Specifically, controller 300 controls operation of housing motor 260, plunger-mechanism motor 270, and gripper motor 280. Additionally, controller 300 stores instructions for operating housing motor 260, plunger-mechanism motor 270, and gripper motor 280. The instructions include a sequence of motor operations to be performed during operation of end effector 200. In one or more examples, controller 300 is programmed to automatically perform a seal-cap installation operation by sequentially operating:

housing motor 260 to rotate main housing 210 to the cap-receiving position, thereby to align cap-dispenser assembly 120 with seal-cap-delivery-sleeve central axis 124;

plunger-mechanism motor 270 to translate plunger mechanism 220 to the extended position, so that inner gripper 230 is adjacent cap-dispenser assembly 120;

gripper motor 280 to rotate inner gripper 230 to the cap-retaining configuration, so that first finger 231 and second finger 233 grasp pre-molded seal cap 102;

plunger-mechanism motor 270 to translate plunger mechanism 220 to the retracted position, to reduce potential interference during subsequent movement of main housing 210;

housing motor 260 to rotate main housing 210 to the cap-installing position, thereby to align cap-dispenser assembly 120 with one of fasteners 104;

plunger-mechanism motor 270 to translate plunger mechanism 220 to the extended position, so that inner gripper 230 is adjacent one of fasteners 104;

gripper motor 280 to rotate inner gripper 230 to the cap-releasing configuration, thereby to install one of pre-molded seal caps 102 on one of fasteners 104; and plunger-mechanism motor 270 to translate plunger mechanism 220 to the retracted position, thereby to reduce potential interference during subsequent movement of main housing 210.

In various examples, controller 300 includes at least one electronic controller (e.g., a programmable processor). Controller 300 is operatively coupled to housing motor 260 and controls the angular position of main housing 210 between the cap-receiving position and the cap-installing position. Controller 300 also is operatively coupled to plunger-mechanism motor 270 and controls translation of plunger mechanism 220 between the retracted position and the extended position. Still further, controller 300 is operatively coupled to gripper motor 280 and controls rotation of inner gripper 230 between the cap-releasing configuration and the cap-retaining configuration.

In various examples, controller 300 is programmed to operate housing motor 260, plunger-mechanism motor 270, and gripper motor 280 in the sequence, presented above, thereby to install one of pre-molded seal caps 102 onto one of fasteners 104.

Referring generally to FIG. 1 and particularly to, e.g., FIGS. 12-14 for illustrative purposes only and not by way of limitation, controller 300 is further programmed, after operating gripper motor 280 to rotate inner gripper 230 to the cap-releasing configuration, to operate gripper motor 280 to rotate inner gripper 230 through at least predetermined angle 249, prior to operating plunger-mechanism motor 270 to translate plunger mechanism 220 to the retracted position relative to main housing 210. The preceding portion of this paragraph characterizes example thirty-one of the subject matter, disclosed herein, where example thirty-one also encompasses example thirty, above.

Rotation of inner gripper 230 through predetermined angle 249, after operating gripper motor 280 to rotate inner gripper 230 to the cap-releasing configuration and prior to operating plunger-mechanism motor 270 to translate plunger mechanism 220 to the retracted position, more reliably installs pre-molded seal cap 102 on one of fasteners 104. In addition, in examples where pre-molded seal cap 102 is filled with sealant 154, rotation of inner gripper 230 more evenly distributes sealant 154 over one of fasteners 104. Use of controller 300 to operate gripper motor 280 enables more precise and reliable rotation of inner gripper 230.

Referring generally to FIG. 1 and particularly to, e.g., FIG. 13 for illustrative purposes only and not by way of limitation, predetermined angle 249 is 360 degrees. The preceding portion of this paragraph characterizes example thirty-two of the subject matter, disclosed herein, where example thirty-two also encompasses example thirty-one, above.

Rotating inner gripper through predetermined angle 249 of 360 degrees ensures that sealant 154 is distributed around the entire surface of one of fasteners 104.

Referring generally to FIG. 1 and particularly to, e.g., FIGS. 8-10 and 15-16 for illustrative purposes only and not by way of limitation, system 100 further comprises sealant dispenser 150, comprising nozzle 152, configured to discharge sealant 154. Housing motor 260 is further configured to rotate main housing 210 to sealant-receiving position, in which plunger mechanism 220 is aligned with nozzle 152 of sealant dispenser 150. The preceding portion of this paragraph characterizes example thirty-three of the subject matter, disclosed herein, where example thirty-three also encompasses example thirty-two, above.

Sealant dispenser 150 enables automated filling of one of pre-molded seal caps 102 with sealant 154. Nozzle 152 of sealant dispenser 150 positively locates the position, at which sealant 154 is discharged. Using housing motor 260 to rotate main housing 210 to sealant-receiving position enables more precise and reliable alignment of plunger mechanism 220 with nozzle 152 of sealant dispenser 150.

Referring generally to FIG. 1 and particularly to, e.g., FIG. 15 for illustrative purposes only and not by way of limitation, sealant dispenser 150 comprises sealant-dispenser housing 156, configured to receive cartridge 158 that holds sealant 154. Cartridge 158 comprises cartridge outlet 160, configured to fluidically communicate with nozzle 152. Sealant dispenser 150 further comprises pressurized-air valve 162, configured to selectively pressurize cartridge 158, so that sealant 154 is dispensed through nozzle 152. The preceding portion of this paragraph characterizes example thirty-four of the subject matter, disclosed herein, where example thirty-four also encompasses example thirty-three, above.

Sizing sealant-dispenser housing 156 to receive cartridge 158 permits sealant dispenser 150 to use commercially available, pre-packaged containers of sealant. Accordingly, the composition of sealant 154 is certified, and use of cartridge 158 reduces direct exposure of users to sealant material.

Referring generally to FIG. 1 and particularly to, e.g., FIG. 16 for illustrative purposes only and not by way of limitation, sealant dispenser 150 comprises mixing block 178, first pressurized-sealant line 170, configured to deliver first sealant sub-composition 172 to mixing block 178, and second pressurized-sealant line 174, configured to deliver second sealant sub-composition 176 to mixing block 178. Mixing block 178 is configured to mix first sealant sub-composition 172 and second sealant sub-composition 176 to form sealant 154. Mixing block 178 comprises outlet 180 that fluidically communicates with nozzle 152. The preceding portion of this paragraph characterizes example thirty-five of the subject matter, disclosed herein, where example thirty-five also encompasses example thirty-three, above.

Use of first pressurized-sealant line 170 holding first sealant sub-composition 172, and second pressurized-sealant line 174 holding second sealant sub-composition 176 reduces landfill requirements associated with cartridges and increases operational efficiency by eliminating the need to remove and replace cartridges.

Referring generally to FIG. 1 and particularly to, e.g., FIGS. 8-10 for illustrative purposes only and not by way of limitation, controller 300 is further programmed, immediately prior to operating housing motor 260 to rotate main housing 210 to the cap-installing position, to operate housing motor 260 to rotate main housing 210 to sealant-receiving position, to operate plunger-mechanism motor 270 to translate plunger mechanism 220 to the extended position relative to main housing 210, so that inner gripper 230 is adjacent nozzle 152 of sealant dispenser 150, and to operate plunger-mechanism motor 270 to translate plunger mechanism 220 to the retracted position relative to main housing 210. The preceding portion of this paragraph characterizes example thirty-six of the subject matter, disclosed herein, where example thirty-six also encompasses any one of examples thirty-three to thirty-five, above.

Use of controller 300 to rotate main housing 210 to sealant-receiving position more reliably aligns plunger mechanism 220 with nozzle 152 of sealant dispenser 150 to fill one of pre-molded seal caps 102 with sealant 154. In one or more examples, controller 300 is programmed to automatically fill one of pre-molded seal caps 102 with sealant 154 by:

operating housing motor 260 to rotate main housing 210 to sealant-receiving position, thereby to align plunger mechanism 220 with nozzle 152;

operating plunger-mechanism motor 270 to translate plunger mechanism 220 to the extended position, so that inner gripper 230 is adjacent nozzle 152 of sealant dispenser, to facilitate discharge of sealant 154 into one of pre-molded seal caps 102; and operating plunger-mechanism motor 270 to translate plunger mechanism 220 to the retracted position, thereby to reduce potential interference during subsequent movement of main housing 210.

Referring generally to FIG. 1 and particularly to, e.g., FIGS. 8-10 for illustrative purposes only and not by way of limitation, controller 300 is operatively coupled to sealant dispenser 150. Controller 300 is further programmed to operate sealant dispenser 150 to dispense sealant 154 while inner gripper 230 is adjacent nozzle 152. The preceding portion of this paragraph characterizes example thirty-seven of the subject matter, disclosed herein, where example thirty-seven also encompasses example thirty-six, above.

Use of controller 300 to control dispensing of sealant 154 permits more reliable and precise automated filling of one of pre-molded seal caps 102 with sealant 154.

Referring generally to FIG. 1 and particularly to, e.g., FIGS. 3-5 for illustrative purposes only and not by way of limitation, plunger mechanism 220 further comprises ribbed shaft 232, coupled to inner gripper 230. The preceding portion of this paragraph characterizes example thirty-eight of the subject matter, disclosed herein, where example thirty-eight also encompasses any one of examples thirty-three to thirty-seven, above.

Use of ribbed shaft 232 coupled to inner gripper 230 facilitates mechanical interface of inner gripper 230 with plunger-mechanism motor 270 and gripper motor 280.

Referring generally to FIG. 1 and particularly to, e.g., FIGS. 3-5 for illustrative purposes only and not by way of limitation, plunger-mechanism motor 270 is operably coupled to ribbed shaft 232. The preceding portion of this paragraph characterizes example thirty-nine of the subject matter, disclosed herein, where example thirty-nine also encompasses example thirty-eight, above.

Operably coupling ribbed shaft 232 with plunger-mechanism motor 270 increases the range between the retracted position and the extended position of plunger mechanism 220.

Referring generally to FIG. 1 and particularly to, e.g., FIGS. 3-5 for illustrative purposes only and not by way of limitation, ribbed shaft 232 has ribbed-shaft central axis 234. Ribbed shaft 232 further comprises projection 236, extending perpendicular to ribbed-shaft central axis 234. The preceding portion of this paragraph characterizes example forty of the subject matter, disclosed herein, where example forty also encompasses example thirty-nine, above.

Use of projection 236 on ribbed shaft 232 facilitates mechanical interface of gripper motor 280 with inner gripper 230.

Referring generally to FIG. 1 and particularly to, e.g., FIGS. 4-5 for illustrative purposes only and not by way of limitation, cap-placement assembly 202 further comprises rotation sleeve 237, coupled to gripper motor 280. Rotation sleeve 237 is configured to rotate responsive to controller 300 operating gripper motor 280. Rotation sleeve 237 comprises elongate slot 238, extending parallel to ribbed-shaft central axis 234. Elongate slot 238 is configured to mechanically engage projection 236 of ribbed shaft 232. Ribbed shaft 232 and inner gripper 230 are configured to rotate responsive to rotation sleeve 237 being rotated by gripper motor 280. The preceding portion of this paragraph characterizes example forty-one of the subject matter, disclosed herein, where example forty-one also encompasses example forty, above.

Use of rotation sleeve 237 with elongate slot 238 further facilitates mechanical interface of gripper motor 280 with inner gripper 230 without interfering with translation of plunger mechanism 220. Specifically, mechanical engagement of elongate slot 238 with projection 236 rotationally couples rotation sleeve 237 to ribbed shaft 232, thereby permitting gripper motor 280 to rotate inner gripper 230. Extension of elongate slot 238 parallel to ribbed-shaft central axis 234 maintains mechanical engagement of elongate slot 238 while permitting ribbed shaft 232 to translate in response to operation of plunger-mechanism motor 270.

Referring generally to FIG. 1 and particularly to, e.g., FIG. 4 for illustrative purposes only and not by way of limitation, ribbed shaft 232 comprises discrete, circumferentially closed ribs 240. Each of discrete, circumferentially closed ribs 240 extends perpendicular to ribbed-shaft central axis 234. The preceding portion of this paragraph characterizes example forty-two of the subject matter, disclosed herein, where example forty-two also encompasses example forty or forty-one, above.

Use of discrete, circumferentially closed ribs 240 facilitates mechanical coupling of ribbed shaft 232 to plunger-mechanism motor 270.

Referring generally to FIG. 1 and particularly to, e.g., FIGS. 2-5 for illustrative purposes only and not by way of limitation, plunger mechanism 220 further comprises gripper gear 242, coupled to plunger-mechanism motor 270. Gripper gear 242 comprises gear teeth 244, configured to mesh with discrete, circumferentially closed ribs 240. The preceding portion of this paragraph characterizes example forty-three of the subject matter, disclosed herein, where example forty-three also encompasses example forty-two, above.

Use of gripper gear 242 with gear teeth 244 meshing with spaces 246 enables precise mechanical coupling of plunger-mechanism motor 270 to ribbed shaft 232, thereby minimizing lost motion during translation of plunger mechanism 220.

Referring generally to FIG. 1 and particularly to, e.g., FIGS. 2 and 17-18 for illustrative purposes only and not by way of limitation, seal-cap-delivery sleeve 122 of cap-dispenser assembly 120 comprises seal-cap-delivery-sleeve inlet 126 and seal-cap-delivery-sleeve outlet 128. Seal-cap-delivery-sleeve outlet 128 is positioned closer to cap-placement assembly 202 than to seal-cap-delivery-sleeve inlet 126. The preceding portion of this paragraph characterizes example forty-four of the subject matter, disclosed herein, where example forty-four also encompasses any one of examples twenty-six to forty-three, above.

Use of seal-cap-delivery sleeve 122 permits a plurality of pre-molded seal caps 102 to be available for installation by end effector 200, thereby allowing more rapid installation of a plurality of pre-molded seal caps 102 onto a plurality of fasteners 104.

Referring generally to FIG. 1 and particularly to, e.g., FIG. 2 for illustrative purposes only and not by way of limitation, when main housing 210 is in the cap-receiving position, and when plunger mechanism 220 is in the extended position relative to main housing 210, plunger mechanism 220 is adjacent seal-cap-delivery-sleeve outlet 128. The preceding portion of this paragraph characterizes example forty-five of the subject matter, disclosed herein, where example forty-five also encompasses example forty-four, above.

Positioning plunger mechanism 220 adjacent seal-cap-delivery-sleeve outlet 128 enables more reliable grasping and removing of a leading one of pre-molded seal caps 102 from seal-cap-delivery sleeve 122.

Referring generally to FIG. 1 and particularly to, e.g., FIGS. 17-18 for illustrative purposes only and not by way of limitation, system 100 further comprises high-level cap sensor 130, configured to detect when one of pre-molded seal caps 102 in seal-cap-delivery sleeve 122 is at a predetermined location, adjacent seal-cap-delivery-sleeve inlet 126. The preceding portion of this paragraph characterizes example forty-six of the subject matter, disclosed herein, where example forty-six also encompasses example forty-four or forty-five, above.

Use of high-level cap sensor 130 provides an indication of the number of pre-molded seal caps 102, stored in seal-cap-delivery sleeve 122. Presence of pre-molded seal caps 102 at seal-cap-delivery-sleeve inlet 126 indicates that a supply of pre-molded seal caps 102 is available for cap-placement assembly 202. Absence of pre-molded seal caps 102 at seal-cap-delivery-sleeve inlet 126 indicates a demand for pre-molded seal caps 102 to be added to seal-cap-delivery sleeve 122. Accordingly, high-level cap sensor 130 enables more continuous operation of end effector 200 by providing an advance indication of a need for more pre-molded seal caps 102 in seal-cap-delivery sleeve 122. As used herein, the term "adjacent" means a distance, approximately equal to a height of one of pre-molded seal caps 102. Accordingly, in various examples, high-level cap sensor 130 detects when one of pre-molded seal caps 102 is present within a portion of seal-cap-delivery sleeve 122 that extends from seal-cap-delivery-sleeve inlet 126 to a point that is spaced from seal-cap-delivery-sleeve inlet 126 by a distance, equal to a height of one of pre-molded seal caps 102.

Referring generally to FIG. 1 and particularly to, e.g., FIGS. 17-18 for illustrative purposes only and not by way of limitation, system 100 further comprises low-level cap sensor 132, configured to detect when one of pre-molded seal caps 102 in seal-cap-delivery sleeve 122 is at predetermined location adjacent seal-cap-delivery-sleeve outlet 128. The preceding portion of this paragraph characterizes example forty-seven of the subject matter, disclosed herein, where example forty-seven also encompasses any one of examples forty-four to forty-six, above.

Use of low-level cap sensor 132 provides an indication that none of pre-molded seal caps 102 is available for cap-placement assembly 202. An indication from low-level cap sensor 132 that none of pre-molded seal caps 102 are present in seal-cap-delivery sleeve 122 enables a user to immediately cease operation, thereby avoiding wasted time on ineffective operation of end effector 200. As used herein, the term "adjacent" means a distance approximately equal to a height of one of pre-molded seal caps 102. Accordingly, in various examples, low-level cap sensor 132 detects when one of pre-molded seal caps 102 is present within a portion of seal-cap-delivery sleeve 122 that extends from seal-cap-delivery-sleeve outlet 128 to a point that is spaced from seal-cap-delivery-sleeve outlet 128 by a distance, equal to a height of one of pre-molded seal caps 102.

Referring generally to FIG. 1 and particularly to, e.g., FIGS. 17-18 for illustrative purposes only and not by way of limitation, cap-dispenser assembly 120 further comprises hopper assembly 134, configured to feed pre-molded seal caps 102 into seal-cap-delivery-sleeve inlet 126. The preceding portion of this paragraph characterizes example forty-eight of the subject matter, disclosed herein, where example forty-eight also encompasses any one of examples forty-four to forty-seven, above.

Use of hopper assembly 134 enables a more continuous feed of pre-molded seal caps 102 to seal-cap-delivery-sleeve inlet 126, thereby ensuring a constant supply of pre-molded seal caps 102 in seal-cap-delivery sleeve 122 that are available for use by cap-placement assembly 202.

Referring generally to FIG. 1 and particularly to, e.g., FIGS. 17-18 for illustrative purposes only and not by way of limitation, hopper assembly 134 comprises hopper 136, comprising slotted feed ramp 138. Hopper assembly 134 also comprises feed disc 140, rotatable relative to hopper 136 and comprising cap-receiving slot 142, configured to receive one of pre-molded seal caps 102. Hopper assembly 134 further comprises feed motor 144, configured to rotate feed disc 140 from cap-feeding position, in which cap-receiving slot 142 is aligned with slotted feed ramp 138, to cap-dispensing position, in which cap-receiving slot 142 is aligned with seal-cap-delivery-sleeve inlet 126. The preceding portion of this paragraph characterizes example forty-nine of the subject matter, disclosed herein, where example forty-nine also encompasses example forty-eight, above.

Use of slotted feed ramp 138 places pre-molded seal caps 102 in proper orientation for transfer into seal-cap-delivery sleeve 122. Use of feed disc 140 positively locates each one of pre-molded seal caps 102 during transfer from hopper 136 to seal-cap-delivery sleeve 122. Use of feed motor 144 enables more precise control and timing of transfer of each one of pre-molded seal caps 102 from hopper 136 to seal-cap-delivery sleeve 122.

Referring generally to FIG. 1 and particularly to, e.g., FIGS. 17-18 for illustrative purposes only and not by way of limitation, hopper assembly 134 further comprises air valve 145. Air valve 145 comprises valve outlet 146, aligned with cap-receiving slot 142 when feed disc 140 is in cap-dispensing position and aligned with seal-cap-delivery-sleeve inlet 126. Air valve 145 also comprises valve inlet 147, which is in fluidic communication with valve outlet 146. The preceding portion of this paragraph characterizes example fifty of the subject matter, disclosed herein, where example fifty also encompasses example forty-nine, above.

Use of air valve 145 more precisely and reliably discharges one of pre-molded seal caps 102 from cap-receiving slot 142 into seal-cap-delivery sleeve 122. In various examples, air valve 145 is in fluidic communication with pressurized air source 148. Accordingly, air valve 145 is selectively operable to discharge pressurized air toward cap-receiving slot 142 when feed disc 140 is in cap-dispensing position. The pressurized air impacts one of pre-molded seal caps 102 disposed in cap-receiving slot 142 with sufficient force to push one of pre-molded seal caps 102 out of cap-receiving slot 142 and into seal-cap-delivery-sleeve inlet 126.

Referring generally to FIG. 1 and particularly to, e.g., FIG. 19 for illustrative purposes only and not by way of limitation, method 400 of installing pre-molded seal caps 102 onto fasteners 104 that extend from surface 106 is disclosed. Method 400 comprises (block 402) rotating main housing 210 of end effector 200 to cap receiving position, in which plunger mechanism 220 of cap-placement assembly 202, is aligned with cap-dispenser assembly 120, while holding one of pre-molded seal caps 102. Method 400 further comprises (block 404) translating plunger mechanism 220 to the extended position, relative to main housing 210, so that inner gripper 230 of plunger mechanism 220 is adjacent one of pre-molded seal caps 102 in cap-dispenser assembly 120. Method 400 further comprises (block 405) rotating inner gripper 230 to the cap-retaining configuration, so that inner gripper 230 mechanically engages one of pre-molded seal caps 102 in cap-dispenser assembly 120. Method 400 further comprises (block 406) translating plunger mechanism 220 to the retracted position relative to main housing 210, thereby to retrieve one of pre-molded seal caps 102 from cap-dispenser assembly. Method 400 further comprises (block 408) rotating main housing 210 to the cap-installing position, in which plunger mechanism 220 is aligned with one of fasteners 104 provided on surface 106. Method 400 further comprises (block 410) translating plunger mechanism 220 to the extended position, so that one of pre-molded seal caps 102 is disposed over one of fasteners. Method 400 further comprises (block 412) rotating inner gripper 230 to the cap-releasing configuration, so that inner gripper 230 disengages from one of pre-molded seal caps 102. Method 400 further comprises (block 414) translating plunger mechanism 220 to the retracted position, so that one of pre-molded seal caps 102 is installed on one of fasteners 104.

In one or more examples, method 400 further comprises (block 416), after rotating inner gripper 230 to the cap-releasing configuration (block 412), and before translating plunger mechanism 220 to the retracted position (block 414), rotating inner gripper 230 through a predetermined angular displacement.

In one or more examples, method 400 further comprises, after translating plunger mechanism 220 to the retracted position (block 406), and before rotating main housing 210 to the cap-installing position (block 408), rotating main housing 210 to sealant receiving position (block 418), in which plunger mechanism 220 is aligned with nozzle 152 of sealant dispenser 150, translating plunger mechanism 220 to the extended position (block 420), so that inner gripper 230 is adjacent nozzle 152 of sealant dispenser 150, and translating plunger mechanism 220 to the retracted position (block 422).

Figure 21:
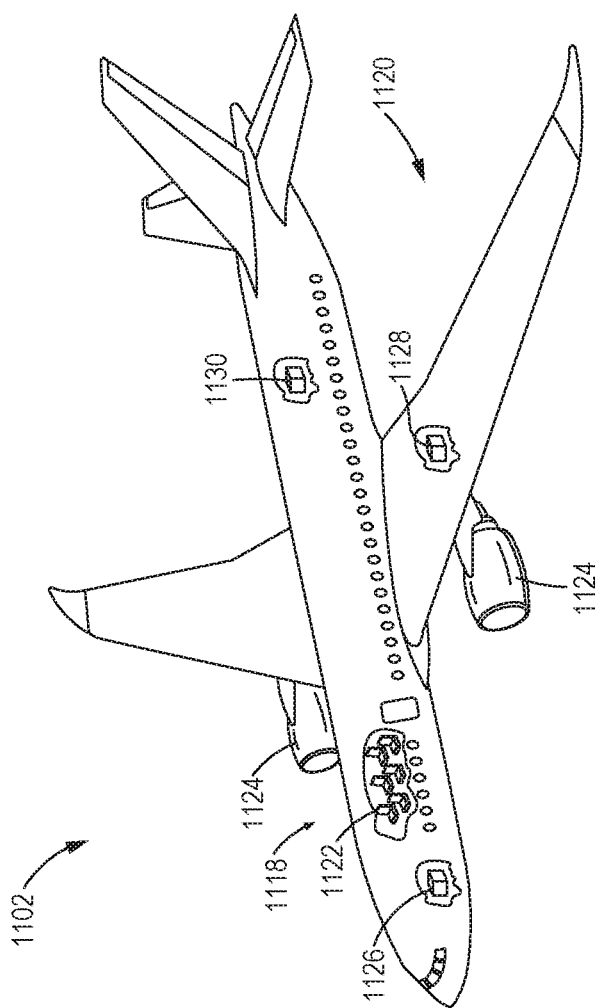
FIG. 21 is a schematic illustration of an aircraft.

Examples of the subject matter, disclosed herein may be described in the context of aircraft manufacturing and service method 1100 as shown in FIG. 20 and aircraft 1102 as shown in FIG. 21. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 21, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. An end effector (200) for installing pre-molded seal caps (102) onto fasteners (104) that extend from a surface (106), the end effector (200) comprising:
    a frame (204);
    a cap-dispenser assembly (120), coupled to the frame (204) and comprising a seal-cap-delivery sleeve (122), having a seal-cap-delivery-sleeve central axis (124); and
    a cap-placement assembly (202), coupled to the frame (204), rotatable relative to the frame (204), and comprising:
        a main housing (210); and
        a plunger mechanism (220), coupled to the main housing (210) and comprising:
            an outer plunger housing (222), comprising an interior chamber (224) that has an interior-chamber central axis (223); and
            an inner gripper (230), at least a portion of which is located in the interior chamber (224) of the outer plunger housing (222),
    wherein:
    the inner gripper (230) comprises a first finger (231) and a second finger (233);
    the first finger (231) and the second finger (233) are opposite each other along a finger axis (235), perpendicular to the interior-chamber central axis (223);
    the inner gripper (230) is rotatable relative to the outer plunger housing (222), within the interior chamber (224), between a cap-retaining configuration and a cap-releasing configuration;
    the first finger (231) and the second finger (233) are closer to each other in the cap-retaining configuration than in the cap-releasing configuration;
    the plunger mechanism (220) is selectively translatable, relative to the main housing (210), from an extended position to a retracted position and from the retracted position to the extended position;
    the outer plunger housing (222) of the plunger mechanism (220) protrudes farther from the main housing (210) when the plunger mechanism (220) is in the extended position than when the plunger mechanism (220) is in the retracted position; and
    the main housing (210) is selectively rotatable from a cap-receiving position, in which the plunger mechanism (220) is aligned with the seal-cap-delivery-sleeve central axis (124), to a cap-installing position, in which the main housing (210) is angularly displaced from the cap-receiving position, and from the cap-installing position to the cap-receiving position.

2. The end effector (200) according to claim 1, wherein:
    the seal-cap-delivery sleeve (122) of the cap-dispenser assembly (120) comprises a seal-cap-delivery-sleeve inlet (126) and a seal-cap-delivery-sleeve outlet (128); and
    the seal-cap-delivery-sleeve outlet (128) is positioned closer to the cap-placement assembly (202) than to the seal-cap-delivery-sleeve inlet (126).

3. The end effector (200) according to claim 2, wherein, when the main housing (210) is in the cap-receiving position, and when the plunger mechanism (220) is in the extended position relative to the main housing (210), the plunger mechanism (220) is adjacent the seal-cap-delivery-sleeve outlet (128).

4. The end effector (200) according to claim 2, wherein the cap-dispenser assembly (120) further comprises a hopper assembly (134), configured to feed pre-molded seal caps (102) into the seal-cap-delivery-sleeve inlet (126).

5. The end effector (200) according to claim 1, wherein the cap-placement assembly (202) further comprises a housing motor (260), configured to selectively rotate the main housing (210) from the cap-receiving position to the cap-installing position and from the cap-installing position to the cap-receiving position.

6. The end effector (200) according to claim 5, wherein the cap-placement assembly (202) further comprises a plunger-mechanism motor (270), configured to selectively translate the plunger mechanism (220) from the extended position to the retracted position, relative to the main housing (210), and from the retracted position to the extended position.

7. The end effector (200) according to claim 6, wherein the cap-placement assembly (202) further comprises a gripper motor (280), configured to rotate the inner gripper (230) from the cap-retaining configuration to the cap-releasing configuration and from the cap-releasing configuration to the cap-retaining configuration.

8. The end effector (200) according to claim 7, further comprising a controller (300), operably coupled to the housing motor (260), the plunger-mechanism motor (270), and the gripper motor (280), wherein the controller (300) is programmed to operate:
    the housing motor (260) to rotate the main housing (210) to the cap-receiving position;
    the plunger-mechanism motor (270) to translate the plunger mechanism (220) to the extended position relative to the main housing (210), so that the inner gripper (230) is adjacent the cap-dispenser assembly (120);
    the gripper motor (280) to rotate the inner gripper (230) to the cap-retaining configuration;
    the plunger-mechanism motor (270) to translate the plunger mechanism (220) to the retracted position relative to the main housing (210);
    the housing motor (260) to rotate the main housing (210) to the cap-installing position;
    the plunger-mechanism motor (270) to translate the plunger mechanism (220) to the extended position relative to the main housing (210);
    the gripper motor (280) to rotate the inner gripper (230) to the cap-releasing configuration; and the plunger-mechanism motor (270) to translate the plunger mechanism (220) to the retracted position relative to the main housing (210).

9. The end effector (200) according to claim 8, wherein the controller (300) is further programmed, after operating the gripper motor (280) to rotate the inner gripper (230) to the cap-releasing configuration, to operate the gripper motor (280) to rotate the inner gripper (230) through at least a predetermined angle (249), prior to operating the plunger-mechanism motor (270) to translate the plunger mechanism (220) to the retracted position relative to the main housing (210).

10. The end effector (200) according to claim 9, wherein the predetermined angle (249) is 360 degrees.

11. The end effector (200) according to claim 10, further comprising a sealant dispenser (150), comprising a nozzle (152), configured to discharge sealant (154), wherein the housing motor (260) is further configured to rotate the main housing (210) to a sealant-receiving position, in which the plunger mechanism (220) is aligned with the nozzle (152) of the sealant dispenser (150).

12. The end effector (200) according to claim 11, wherein the sealant dispenser (150) comprises:
 a sealant-dispenser housing (156), configured to receive a cartridge (158) that holds the sealant (154), wherein the cartridge (158) comprises a cartridge outlet (160), configured to fluidically communicate with the nozzle (152); and
 a pressurized-air valve (162), configured to selectively pressurize the cartridge (158), so that the sealant (154) is dispensed through the nozzle (152).

13. The end effector (200) according to claim 11, wherein: the sealant dispenser (150) comprises:
 a mixing block (178);
 a first pressurized-sealant line (170), configured to deliver a first sealant sub-composition (172) to the mixing block (178); and
 a second pressurized-sealant line (174), configured to deliver a second sealant sub-composition (176) to the mixing block (178);
 the mixing block (178) is configured to mix the first sealant sub-composition (172) and the second sealant sub-composition (176) to form the sealant (154); and
 the mixing block (178) comprises an outlet (180) that fluidically communicates with the nozzle (152).

14. The end effector (200) according to claim 11, wherein the controller (300) is further programmed, immediately prior to operating the housing motor (260) to rotate the main housing (210) to the cap-installing position, to:
 operate the housing motor (260) to rotate the main housing (210) to the sealant-receiving position;
 operate the plunger-mechanism motor (270) to translate the plunger mechanism (220) to the extended position relative to the main housing (210), so that the inner gripper (230) is adjacent the nozzle (152) of the sealant dispenser (150); and
 operate the plunger-mechanism motor (270) to translate the plunger mechanism (220) to the retracted position relative to the main housing (210).

15. The end effector (200) according to claim 14, wherein:
 the controller (300) is operatively coupled to the sealant dispenser (150); and
 the controller (300) is further programmed to operate the sealant dispenser (150) to dispense the sealant (154) while the inner gripper (230) is adjacent the nozzle (152).

16. The end effector (200) according to claim 15, wherein the plunger mechanism (220) further comprises a ribbed shaft (232), coupled to the inner gripper (230).

17. The end effector (200) according to claim 16, wherein the plunger-mechanism motor (270) is operably coupled to the ribbed shaft (232).

18. The end effector (200) according to claim 17, wherein:
 the ribbed shaft (232) has a ribbed-shaft central axis (234); and
 the ribbed shaft (232) further comprises a projection (236), extending perpendicular to the ribbed-shaft central axis (234).

19. The end effector (200) according to claim 18, wherein:
 the cap-placement assembly (202) further comprises a rotation sleeve (237), coupled to the gripper motor (280);
 the rotation sleeve (237) is configured to rotate responsive to the controller (300) operating the gripper motor (280);
 the rotation sleeve (237) comprises an elongate slot (238), extending parallel to the ribbed-shaft central axis (234);
 the elongate slot (238) is configured to mechanically engage the projection (236) of the ribbed shaft (232); and
 the ribbed shaft (232) and inner gripper (230) are configured to rotate responsive to the rotation sleeve (237) being rotated by the gripper motor (280).

20. A system (100) for installing pre-molded seal caps (102) onto fasteners (104) that extend from a surface (106), the system (100) comprising:
 an end effector (200), comprising:
  a frame (204);
  a cap-dispenser assembly (120), coupled to the frame (204) and comprising a seal-cap-delivery sleeve (122), having a seal-cap-delivery-sleeve central axis (124); and
  a cap-placement assembly (202), coupled to the frame (204), rotatable relative to the frame (204), and comprising:
   a main housing (210); and
   a plunger mechanism (220), coupled to the main housing (210) and comprising:
    an outer plunger housing (222), comprising an interior chamber (224) that has an interior-chamber central axis (223); and
    an inner gripper (230), at least a portion of which is located in the interior chamber (224) of the outer plunger housing (222),
  wherein:
   the inner gripper (230) comprises a first finger (231) and a second finger (233);
   the first finger (231) and the second finger (233) are opposite each other along a finger axis (235), perpendicular to the interior-chamber central axis (223);
   the inner gripper (230) is rotatable relative to the outer plunger housing (222), within the interior chamber (224), between a cap-retaining configuration and a cap-releasing configuration;
   the first finger (231) and the second finger (233) are closer to each other in the cap-retaining configuration than in the cap-releasing configuration;
   the plunger mechanism (220) is selectively translatable, relative to the main housing (210), from an extended position to a retracted position and from the retracted position to the extended position;
   the outer plunger housing (222) of the plunger mechanism (220) protrudes farther from the main housing (210) when the plunger mechanism (220) is in the extended position than when the plunger mechanism (220) is in the retracted position; and the main housing (210) is selectively rotatable from a cap-receiving position, in which the plunger mechanism (220) is aligned with the seal-cap-delivery-sleeve central axis (124) to a cap-installing position, in which the main housing (210) is angularly displaced from the cap-receiving position, and from the cap-installing position to the cap-receiving position;

a controller (300), operatively coupled to the end effector (200); and a robot (110), supporting the end effector (200) and the controller (300).

\* \* \* \* \*